(12) United States Patent
Du et al.

(10) Patent No.: US 11,064,185 B2
(45) Date of Patent: Jul. 13, 2021

(54) SYSTEMS, METHODS AND DEVICES FOR GENERATING DEPTH IMAGE

(71) Applicant: Rayz Technologies Co. Ltd., Beijing (CN)

(72) Inventors: Detao Du, Beijing (CN); Ruxin Chen, Beijing (CN)

(73) Assignee: Rayz Technologies Co. Ltd., Beijing (CN)

(*) Notice: Subject to any disclaimer, the term of this patent is extended or adjusted under 35 U.S.C. 154(b) by 0 days.

(21) Appl. No.: 17/010,705

(22) Filed: Sep. 2, 2020

(65) Prior Publication Data

US 2021/0067762 A1 Mar. 4, 2021

(30) Foreign Application Priority Data

Sep. 3, 2019 (CN) .......................... 201910831639.7

(51) Int. Cl.
| | |
|---|---|
| *H04N 13/254* | (2018.01) |
| *G01B 11/24* | (2006.01) |
| *H04N 13/239* | (2018.01) |
| *H04N 5/235* | (2006.01) |
| *H04N 13/296* | (2018.01) |
| *G01B 11/25* | (2006.01) |

(52) U.S. Cl.
CPC ....... *H04N 13/254* (2018.05); *G01B 11/2441* (2013.01); *G01B 11/2545* (2013.01); *H04N 5/2353* (2013.01); *H04N 13/239* (2018.05); *H04N 13/296* (2018.05)

(58) Field of Classification Search
CPC .. H04N 13/254; H04N 13/296; H04N 13/239; H04N 5/2353; G01B 11/2441; G01B 11/2545

See application file for complete search history.

(56) References Cited

U.S. PATENT DOCUMENTS

| | | | |
|---|---|---|---|
| 2005/0041949 A1* | 2/2005 | Onuki | G02B 5/22 |
| | | | 385/140 |
| 2018/0213161 A1* | 7/2018 | Kanda | G06F 3/04847 |
| 2019/0033448 A1* | 1/2019 | Molnar | G01S 7/4814 |

* cited by examiner

*Primary Examiner* — Jamie J Atala
*Assistant Examiner* — Hesham K Abouzahra
(74) *Attorney, Agent, or Firm* — Sunstein LLP

(57) ABSTRACT

The present disclosure discloses a system, a method and a device for generating depth image. The system includes an illumination source, an optical system, a control device, and at least one set of a dynamic aperture and an image sensor, wherein the dynamic aperture is configured to dynamically change a light transmittance, an exposure start time, and an exposure end time under a control of the control device. The control device is configured to acquire a first photo and a second photo, and generate a depth image of the target scene according to the first photo, the first shooting configuration information, the second photo, and the second shooting configuration information.

20 Claims, 14 Drawing Sheets

SYSTEMS, METHODS AND DEVICES FOR GENERATING DEPTH IMAGE

CROSS-REFERENCE TO RELATED APPLICATION

This application is related to and claims priority from Chinese Application No. 201910831639.7, filed on Sep. 3, 2019 and entitled "Systems, methods and devices for generating depth image", the entire disclosure of which is hereby incorporated by reference.

TECHNOLOGY FIELD

The embodiments of the present disclosure relate to the field of computer technology, and in particular to systems, methods and devices for generating depth images.

BACKGROUND

As more and more applications rely on 3D information, scene depth measurement becomes more and more important. For example, scenes such as self-driving cars, augmented reality/virtual reality, 3D immersive experience, 3D games, and smartphone 3D applications will all require depth measurement of the scene.

The current imaging methods for measuring the distance of objects in the scene (excluding scanning LIDAR) comprise:

1) stereo graphics imaging vision, binocular imaging and triangulation;
2) using image and object projection related computer vision;
3) using a predetermined lighting pattern (structured light) to illuminate the scene, and using the lighting to analyze the scene, using the calibration information obtained to find the depth information;
4) using the time of flight (TOF, Time Of Flight) camera (multi-light detector) to measure the distance;
5) the Pockels unit being used to adjust the transmission of the signal received from the scene to determine the distance of the object in the scene.

SUMMARY

The embodiments of the present disclosure propose a system, method, and apparatus for generating a depth image.

In the first aspect, the embodiments of the present disclosure provide a system for generating a depth image, the system comprising an illumination source, an optical system, a control device, and at least one set of a dynamic aperture and an image sensor, wherein the dynamic aperture is configured to dynamically change an light transmittance rate an exposure start time and an exposure end time under a control of the control device, and wherein the control device is configured to:

acquire a first photo and a second photo, wherein the first photo and the second photo are images of the scene respectively acquired by the image sensor according to a first shooting configuration information and a second shooting configuration information, the first shooting configuration information includes a first light transmission function and a first light intensity function, and the second shooting configuration information includes a second light transmission function and a second light intensity function, and generate a depth image of the target scene according to the first photo, the first shooting configuration information, the second photo, and the second shooting configuration information, wherein the first light transmission function is used to characterize a corresponding relationship between the time and the light transmittance of the dynamic aperture when the first photo was captured by the image sensor, wherein the second light transmission function is used to characterize a corresponding relationship between the time and the light transmittance of the dynamic aperture when the second photo was captured by the image sensor, wherein the first light intensity function is used to characterize a corresponding relationship between the time and the light intensity of light intensity emitted by the illumination source to the target scene when the first photo is captured, wherein the second light intensity function is used to characterize a corresponding relationship between the time and the light intensity of the light emitted by the illumination source to the target scene when the second photo is captured, wherein the first light transmission function is not constant and/or the second light transmission function is not constant, the first light transmission function is different from the second light transmission function, and/or the first light intensity function is different from the second light intensity function.

In the second aspect, the embodiments of the present disclosure provide a method for generating a depth image, comprising:

acquiring a first photo and a second photo of a scene, by an image sensor, according to a first shooting configuration information and a second shooting configuration information, wherein the first shooting configuration information includes a first light transmission function and a first light intensity function, the second shooting configuration information includes a second light transmission function and a second light intensity function; and generating the depth image of the target scene according to the first photo, the first shooting configuration information, the second photo, and the second shooting configuration information, wherein the first light transmission function is not constant and/or the second light transmission function is not constant, the first light transmission function is different from the second light transmission function, and/or the first light intensity function is different from the second light intensity function.

The advantages obtained due to the above system and methods may include but are not limited to at least one of the followings:

First, the light transmittance is dynamically changed by introducing a dynamic aperture, and the light intensity is dynamically changed by introducing a lighting source, that is, the first photo and the second photo are captured by using different shooting configuration information, and the shooting configuration information is obtained according to the obtained first photo and second photo and then utilize the two photos and the corresponding shooting configuration information to generate a depth image of the target scene. First, the cost of dynamic aperture is not high. Second, any currently commercially available lighting sources and image sensors (for example, currently commercially available cameras) and various lighting sources and image sensors developed in the future (for example, cameras developed in the future) can be used in the system for generating a depth image as mentioned above. Therefore, compared with the existing methods for generating depth images, there are no separate requirements for illumination sources and image sensors, which reduces the economic cost of generating depth images.

Second, the image resolution of any commercially available ordinary camera is generally higher than the image resolution of various imaging devices used in measuring the distance of a scene by using imaging methods. Therefore, compared with the existing methods for generating depth images, the image resolution of the generated depth images is improved.

BRIEF DESCRIPTION OF THE DRAWINGS

By reading the detailed description of the non-limiting embodiments with reference to the following drawings, other features, purposes and advantages of the present disclosure will become more apparent.

DETAILED DESCRIPTION OF EMBODIMENTS

Figure 1:
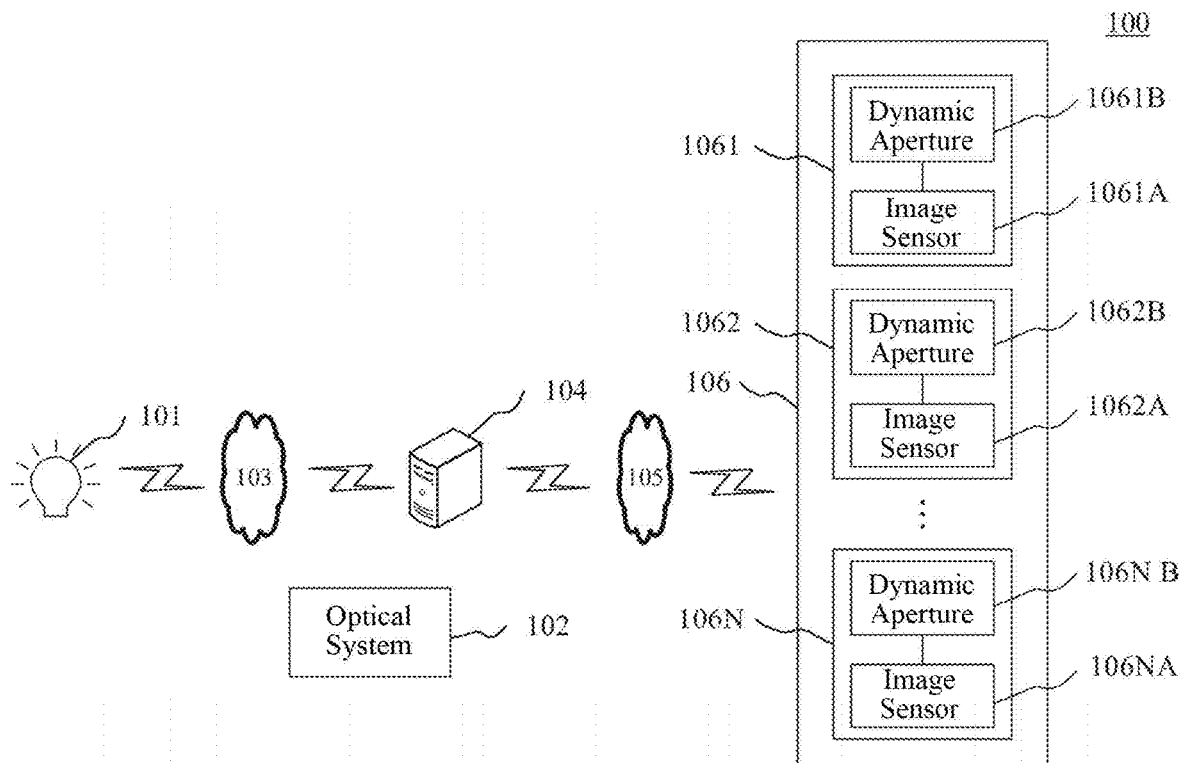
FIG. 1 is a system architecture diagram of a system for generating a depth image according to an embodiment of the present disclosure.

The present disclosure will be further described in detail below in conjunction with the drawings and embodiments. It can be understood that the specific embodiments described here are only used to explain the related invention, but not to limit the invention. In addition, it should be noted that, for ease of description, only the parts related to the relevant invention are shown in the drawings.

It should be noted that the embodiments in the present disclosure and the features in the embodiments can be combined with each other if there is no conflict. Hereinafter, the present disclosure will be described in detail with reference to the drawings and in conjunction with embodiments.

Hereinafter, the detailed description of the following non-limiting embodiments will be discussed with reference to the following numbered control operations, and the corresponding control operations when referred shall be interpreted by the definitions as below.

The first control operation: the illumination source is controlled to emit first illumination light to the target scene within the preset exposure time according to the first light intensity function, wherein the pulse width of the first illuminating light is less than the first preset proportion of the preset exposure time, and the first preset ratio is greater than zero and less than or equal to 1.

The second control operation: controlling the light transmittance of the first dynamic aperture, when the first image sensor captures the photo, within the preset exposure time in accordance with the first light transmission function.

The third control operation: controlling the first image sensor to capture photos of the target scene.

The fourth control operation: the illumination source is controlled to emit second illumination light to the target scene within a preset exposure time according to the second light intensity function, wherein the pulse width of the second illumination light is less than the second preset ratio of the preset exposure time, and the second preset ratio is greater than zero and less than or equal to 1.

The fifth control operation: controlling the light transmittance of the first dynamic aperture corresponding to the first image sensor captures the photo, within the preset exposure time in accordance with the second light transmission function.

The sixth control operation: the second dynamic aperture for the second image sensor for the preset exposure time is controlled according to the second light transmission function $h_2$.

The seventh control operation includes controlling the illumination source to emit the third illuminating light within the preset exposure duration to the target scene.

The eighth control operation: the first image sensor and the second image sensor are controlled to capture photos of the target scene simultaneously.

The ninth control operation: the illumination source is controlled to emit the first illumination light to the target scene in the preset exposure time, which has at least one wavelength $\lambda_1$ belonging to the first preset wavelength set and has the light intensity in line with the first light intensity function.

The tenth control operation: the illumination source is controlled to emit the second illumination light to the target scene in the preset exposure time, which has at least one wavelength $\lambda_2$ belonging to the second preset wavelength set and has the light intensity in line with the second light intensity function $f_2$.

The eleventh control operation: the lighting source is controlled to emit, in the preset exposure time, the first illumination light with the first preset polarization state $P_1$ to the target scene according to the first light strength function $f_1$. Here, the first illumination light is reflected by the target scene and reaches the first dynamic aperture via the polarization plate and the first dynamic aperture.

The twelfth control operation: the lighting source is controlled to emit, in the preset exposure time, the second illumination light with the second preset polarization state $P_2$ to the target scene according to the second light strength function $f_2$. Here, the second illumination light is reflected by the target scene and reaches the second dynamic aperture via the polarization plate and the second dynamic aperture.

The thirteen control operation: controlling the light transmittance of the first dynamic aperture within the preset exposure time according to the first light transmission function for the light whose wavelength belongs to the first preset wavelength set and/or controlling the first dynamic aperture according to the second light transmission function for the light whose wavelength belongs to the second preset wavelength.

The fourteenth control operation: reflectivity and transmission rate of the first dynamic aperture in the preset exposure time transmission are controlled according to the first illumination light transmission function $h_1$ and the second illumination light transmission function $h_2$ respectively.

The fifteenth control operation: controlling the first image sensor to capture a photo of the target scene, and identify the photo captured by the first image sensor as a background light photo.

FIG. 1 shows a system architecture 100 of a system for generating a depth image according to one embodiment of the present disclosure.

As shown in FIG. 1, the system architecture 100 may include an illumination source 101, an optical system 102, a network 103, a control device 104, a network 105, and at least one set of dynamic apertures and corresponding image sensors 106. The at least one set includes: a group 1061 comprising a dynamic aperture 1061A and a corresponding image sensor 1061B, a group 1062 comprising a dynamic aperture 1062A and a corresponding image sensor 1062B, . . . , and a group 106N comprising a dynamic aperture 106NA and a corresponding image sensor 106NB, where N is a natural number.

It should be noted that any two of the dynamic apertures 1061A, 1062A, . . . , 106NA may be two different dynamic apertures, or the same dynamic aperture. Any two of the image sensors 1061B, 1062B, . . . , 106NB may be two different image sensors, or may be the same image sensor.

Here, the lighting source 101 may be various devices with lighting functions, which are not specifically limited in the present disclosure. For example, the lighting sources may include gas discharge light sources, semiconductor light sources, and laser light sources. The products mainly include gas discharge lamps, semiconductor fluorescent lamps (such as LED light-emitting diodes), semiconductor lasers, solid lasers, gas lasers, and so on. It should be noted that the illumination source 101 can be turned on or off under the control of the control device 104, and the wavelength, light intensity, etc. of the emitted light can be dynamically changed.

Here, the optical system 102 refers to a system comprising one or more optical elements combined in a certain order. For example, the optical elements may include, but is not limited to, a lens, a mirror, a prism, a diaphragm, and so on. The optical system 102 is configured to make the light, which is emitted by the illumination source, reflected by the target scene and then make the reflected light imaged on the image sensor.

In some optional implementations of this embodiment, the optical system 102 may include a filter, wherein the filter is configured to only transmit the light emitted by the illumination source 101.

In some optional implementation manners of this embodiment, the optical system 102 may also not include the filter.

In various cameras currently on the market, the aperture can only be controlled to open and close, that is, only the exposure start time and exposure end time of the aperture can be controlled. After the aperture is opened but before it is closed, the transmittance of the aperture is maintained changeless. The dynamic apertures in the present disclosure may be various iris devices that have the functions of dynamically changing the transmittance, the exposure start time, and the exposure end time under the control of the control device.

In some optional implementations of this embodiment, the dynamic aperture may be an image intensifier (Image intensifier). An image intensifier is an optoelectronic device that can convert an optical image with low brightness into an image with sufficient brightness. The control device 104 can control the start time and end time of the image intensifier as well as the overall light transmittance of the image intensifier, by controlling the photocathode voltage, the microchannel plate voltage and the phosphor voltage of the image intensifier over time.

In some optional implementations of this embodiment, the dynamic aperture may also be a Fabry-Pérot interferometer containing a nonlinear crystal. The control device 104 may control the light transmittance of the dynamic aperture by controlling the voltage applied to the nonlinear crystal in the Fabry-Pérot interferometer. Here, the surface of the nonlinear crystal contained in the Fabry-Pérot interferometer may be coated with a transparent conductive film, so that the surface of the nonlinear crystal become a transparent electrode. The light transmittance of the Fabry-Pérot interferometer may be calculated by the following formula:

$$T = \frac{(1-r)^2}{(1-r)^2 + 4r\left(\sin\frac{\varphi}{2}\right)^2}$$

where,

T is the calculated light transmittance of the Fabry-Pérot interferometer, r is the reflectivity of the two glass plates (for example, mirrors) constituting the Fabry-Pérot interferometer, and $\varphi$ is the optical phase difference between 1) the light passing through the Fabry-Pérot interferometer and 2) the light returned from one glass plate of the Fabry-Pérot interferometer and reaching the second glass plate of Fabry-Pérot interferometer.

When the light incident on the two glass plates of the Fabry-Pérot interferometer is normal incident, the optical phase difference $\varphi$ can be calculated according to the following formula:

$$\varphi = \frac{4\pi nL}{\lambda}$$

where:

n is the refractive index of the nonlinear crystal in the Fabry-Pérot interferometer, L is the distance between the two glass plates constituting the Fabry-Pérot rot interferometer, and λ is the wavelength of the light incident on the Fabry-Pérot interferometer.

When the light incident on the two glass plates of the Fabry-Pérot rot interferometer is non-normally incident, the optical phase difference φ can be calculated according to the following formula:

$$\varphi = \frac{4\pi nL}{\lambda}\cos\theta$$

where: θ is the incident angle of light incident on the two glass plates of the Fabry-Pérot interferometer (measured inside the medium).

It can be seen from the above formula that when the refractive index n of the nonlinear crystal is changed, the optical phase difference φ also changes, which in turn causes the light transmittance T of the Fabry-Pérot interferometer to change. Therefore, the control device 104 can change the light transmittance of the dynamic aperture by controlling the refractive index of the nonlinear crystal, that is, the light transmittance of the dynamic aperture is controlled by controlling the voltage applied to the nonlinear crystal to change the refractive index of the nonlinear crystal.

For example, an electro-optic crystal (z-cut $LiNbO_3$) is inserted into the Fabry-Pérot interferometer as a nonlinear crystal. The control device 104 can obtain the time-varying phase difference by modulating the voltage applied to the electro-optic crystal, thereby achieving the effect of controlling the light transmittance of the dynamic aperture. With a suitable voltage, the Fabry-Pérot rot interferometer can achieve a transmittance close to 1 for normal incident light of a specified wavelength. In some optional implementations of this embodiment, the dynamic aperture may also be a Fabry-Pérot interferometer containing piezoelectric crystals. The control device 104 can change the distance between two parallel glass plates in the Fabry-Pérot interferometer by controlling the voltage applied to the piezoelectric crystal in the Fabry-Pérot interferometer, thereby controlling the light phase, then change the light transmittance of the dynamic aperture.

The network 103 is a medium used to provide a communication link between the lighting source 101 and the control device 104. The network 103 may include various connection types, such as wired, wireless communication links, or fiber optic cables.

The user may use the control device 104 to interact with the lighting source 101 through the network 103 to realize the control of the lighting source 101. For example, the user may control to turn on or off the illumination source, control the illumination source to emit illumination light according to what wavelength and what light intensity within what period of time.

The network 105 is used to provide a communication link medium between the control device 104 and at least one group of dynamic apertures and the corresponding image sensor 106. The network 105 may include various connection types, such as wired, wireless communication links, or fiber optic cables.

The user can use the control device 104 to interact with at least one group of dynamic apertures and the corresponding image sensor 106 through the network 105 to realize the control of each dynamic aperture and the image sensor. For example, the exposure start time, exposure end time and light transmittance of the dynamic aperture may be controlled, and the image sensor may be controlled to capture photos, and so on.

The control device 104 may be hardware or software. When the control device 104 is hardware, it may be an electronic device with various control functions. For example, the control device 104 may be a separately set controller, such as a programmable logic controller (Programmable Logic Controller, PLC), a Field Programmable Gate Array (Field Programmable Gate Array, FPGA), a single-chip microcomputer, an industrial control machine, etc.; It can be a device composed of other electronic devices with input/output ports and arithmetic control functions; it can also be a computer device installed with control applications with lighting source control functions, dynamic apertures control functions, and image sensor control functions. When the control device 104 is software, it can be installed in the electronic devices listed above. It can be implemented as multiple software or software modules (for example, to provide lighting source control functions, dynamic apertures control functions, and image sensor control functions), or as a single software or software module. There is no specific limitation here.

It should be noted that the method for generating a depth image provided by the embodiments of the present disclosure is generally executed by the control device 104, and accordingly, the device for generating a depth image is generally provided in the control device 104.

It should be understood that the numbers of illumination sources, control devices, networks, dynamic apertures, and image sensors in FIG. 1 are merely illustrative. It can have any number of lighting sources, control devices, networks, dynamic apertures, and image sensors according to implementation needs.

Figure 2A:
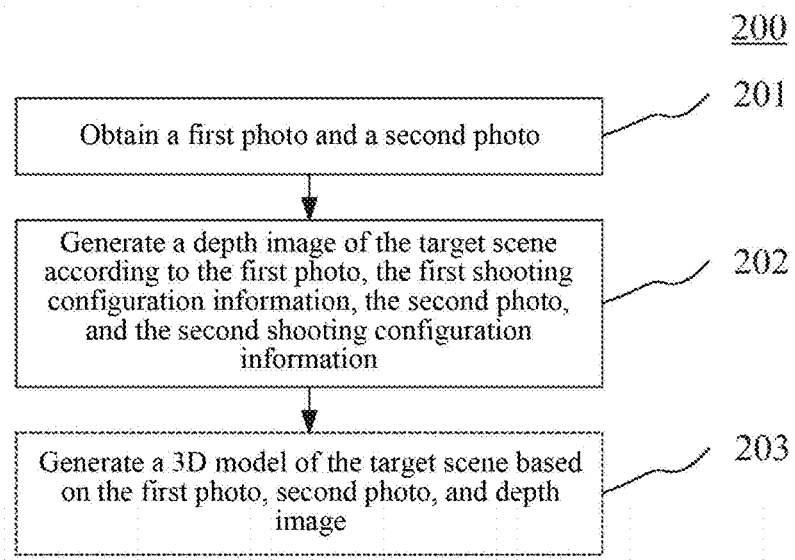
FIG. 2A is a flowchart of a method for generating a depth image according to an embodiment of the present disclosure.

Continuing to refer to FIG. 2A, it shows a process 200 of the method for generating a depth image according to an embodiment of the present disclosure, which is applied to a control device in a system for generating a depth image. The system used to generate the depth image includes an illumination source, an optical system, a control device, and at least one set of dynamic aperture and corresponding image sensor. The dynamic aperture can dynamically change the transmittance, the exposure start time, and the exposure end time under the control of the control device. The method for generating a depth image includes the following steps:

Step 201: Obtain a first photo and a second photo.

In this embodiment, the execution entity of the method for generating a depth image (for example, the control device shown in FIG. 1) may adopt various implementation manners to obtain the first photo and the second photo.

Then, the process of acquiring a first and a second photo with two light intensity functions and/or by two transmission functions as described in the subject disclosure of claim 1 of the present invention is used to generate the depth image of the target scene. In particular, the first photo and the second photo are photos of the scene respectively acquired by the image sensor according to a first shooting configuration information and a second shooting configuration information, the first shooting configuration information includes a first light transmission function and a first light intensity function, and the second shooting configuration information includes a second light transmission function and a second light intensity function.

In this embodiment, the first light transmission function is different from the second light transmission function and/or the first light intensity function is different from the second light intensity function. The first light transmission function is different from the second light transmission function, that is, the corresponding relationship between the time and the light transmittance rate of the dynamic aperture for capturing the first photo during the exposure period of the first photo is different from the corresponding relationship between the time and the light transmittance rate of the aperture for capturing the second photo.

The first light intensity function is different from the second light intensity function, that is, the two following relationships are different:

the corresponding relationship between the time and light intensity of the light, which is emitted from the illumination source to the target scene and is used to generate the depth image when the first photo is captured, and the corresponding relationship between the time and the light intensity of the light, which is emitted from the illumination source to the target scene and is used to generate the depth image when the second photo is captured.

In some optional implementations of this embodiment, the difference between the first light transmission function and the second light transmission function refers to that the integral of the absolute value of the difference of two light transmittance rate for taking the two photos is greater than the fourth preset ratio of the sum of integrals of each light transmittance rate. The two photos are the first photo and the second photos. The photos are captured with corresponding transmittance of the dynamic aperture during the corresponding exposure period.

In practice, the fourth preset ratio may be 0.1.

In some optional implementations of this embodiment, the difference between the first illumination light intensity function and the second illumination light intensity function refers to that the integral of the absolute value of the difference (difference-integral) of first light intensity and the second illumination light for taking the first photo and the second photo is greater than the fourth preset ratio of the sum of integrals (first-integral/second-integral) of each of the two light intensities. The first-integral is carried out during the exposure period when the first photo was captured. The second-integral is carried out during the exposure period when the second photo was captured. The difference-integral is carried out during the exposure period when the first photo was captured/during the exposure period when the second photo was captured. The first illumination light intensity is the intensity of the light emitted to the target scene from the illumination source in the system used to generate the depth image when the first photo was captured. The second illumination light intensity is the intensity of the light emitted to the target scene from the illumination source in the system used to generate the depth image when the second photo was captured.

In practice, the fifth preset ratio may be 0.1. Here, the first photo and the second photo may be captured by the image sensor in the system for generating the depth image, and the image sensor that took the first photo may be the same as or different from the image sensor that took the second photo. In this way, the above-mentioned execution entity can obtain the first photo from the image sensor that took the first photo, and obtain the second photo from the image sensor that took the second photo.

Step 202: a depth image of the target scene is generated according to the first photo, the first shooting configuration information, the second photo, and the second shooting configuration information.

Since the first photo is a photo obtained by shooting the target scene with the first configuration information, and the second photo is a photo obtained by shooting the target scene with the second configuration information, in order to obtain a depth image of the target scene, the above-mentioned execution subject (for example, the control device as shown in FIG. 1) can adopt various implementation methods according to the first photo and the second photo obtained in step 201, and the first configuration information used to capture the first photo and the second configuration information used to capture the second photo, to generate the depth image of the target scene. That is, the distance between the area corresponding to each pixel in the depth image in the target scene and the target image sensor is determined. Here, the target image sensor may be an image sensor that captures a first photo, an image sensor that captures a second photo, or a hypothetical virtual image sensor that captures a depth image.

In some optional implementation manners of this embodiment, the depth image may be an image in which each pixel point only includes the pixel value of one depth value channel, wherein the pixel value of the depth value channel of each pixel is used to represent the distance between the area corresponding to the pixel in the target scene and the target image sensor.

In some optional implementations of this embodiment, the depth image may also be an image in which each pixel includes both the pixel value of the color value channel and the pixel value of the depth value channel. The pixel value of the color value channel of each pixel is used to characterize the color of the area corresponding to the pixel in the target scene. Here, the color value channel may be one or more channels. For example, the color value channel may include an R channel for representing a red color value, a G channel for representing a green color value, and a B channel for representing a blue color value. The pixel value of the depth value channel of each pixel is used to represent the distance between the region corresponding to the pixel in the target scene and the target image sensor.

Figure 2B:
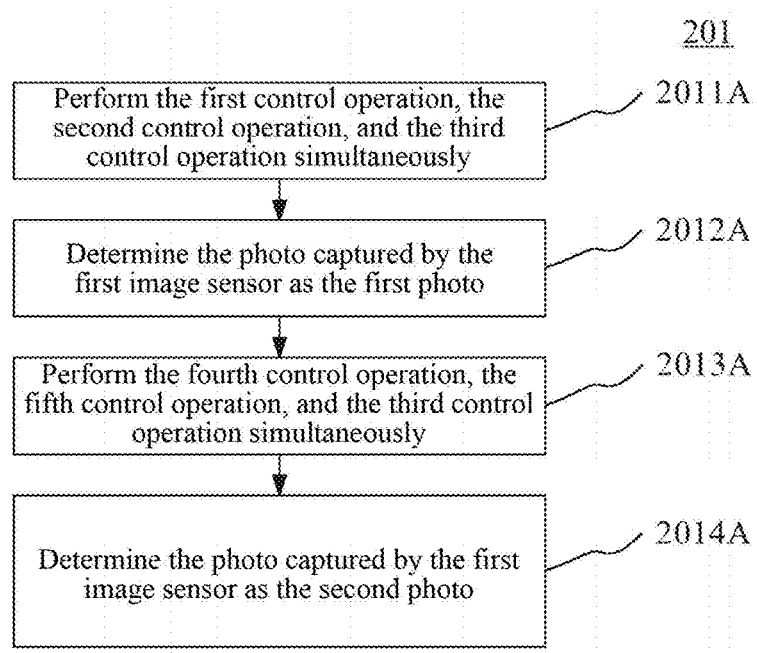
FIG. 2B is an breakdown flowchart of step 201 according to an embodiment of the present disclosure.

In some cases, this embodiment may also have the following optional implementation modes:

Optional implementation (1): the at least one set of dynamic apertures and corresponding image sensors in the system for generating a depth image may include a first dynamic aperture and a corresponding first image sensor. In this way, step 201 may include sub-steps 2011A-2014A as shown in FIG. 2B, which will be discussed hereinafter.

In sub-step 2011A, the first control operation, the second control operation, and the third control operation are performed simultaneously.

In sub-step 2012A, the photo captured by the first image sensor is determined as the first photo. In sub-step 2013A, the fourth control operation, the fifth control operation, and the third control operation are performed simultaneously to capture the second photo.

In sub-step 2014A, the photo captured by the first image sensor is determined as the second photo.

As can be seen from the above description, the first and second photos are two photos captured by the same image sensor (i.e., the first image sensor) at different times. The first light strength function and the first light transmission function were used in the first photo shoot, and the second light force function and the second light transmission function were used in the second photo. The first light transmission function is not a constant and/or the second light transmission function is not a constant, and the first light transmission function is different from the second light transmission function and/or the first light strength function is different from the second light strength function.

It should be noted that the above optional implementation (1) may also include, in addition to the first dynamic aperture and the corresponding first image sensor, other dynamic aperture and corresponding image sensor. The first dynamic aperture and corresponding first image sensor may be used to generate a depth image of the system. Here, only the first image sensor is illustrated as an example.

Figure 2C:
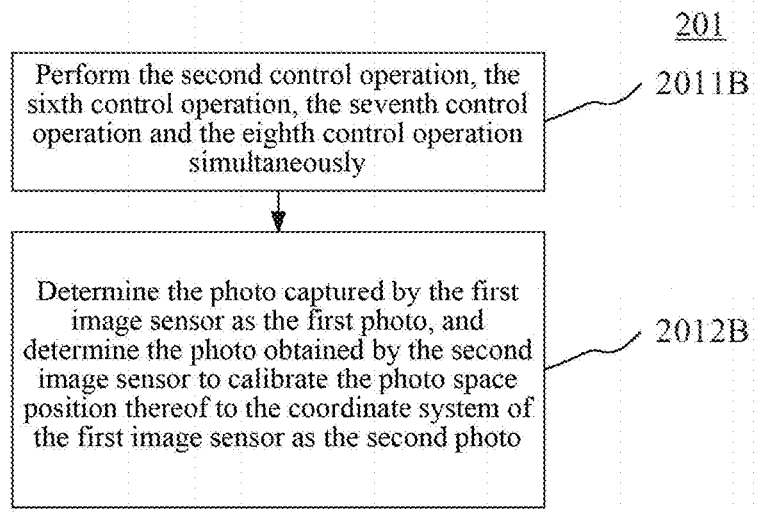
FIG. 2C is an breakdown flowchart of step 201 according to yet another embodiment of the present disclosure.

Optional implementation (2): At least one set of dynamic apertures and corresponding image sensors in the system used to generate a depth image may include the first dynamic aperture and the corresponding first image sensor, as well as the second dynamic aperture and corresponding second image sensor. The first image sensor and the second image sensor may be two independent image sensor chips, the first image sensor and the second image sensor can be two non-repeating parts in the same image sensor chip. In this way, step 201 may also include the sub-step 2011B to sub-step 2012B as shown in FIG. 2C, which are discussed hereinafter.

In sub-step 2011B, it uses the process of using two image sensors as described in the subject disclosure of claim 3 of the present invention to acquire simultaneously the first photo and the second photo of the target scene.

In the sub-step 2012B, it identifies the photo captured by the first image sensor as the first photo, and the photo obtained by the second image sensor to calibrate the photo space position thereof to the coordinate system of the first image sensor as the second photo.

As can be seen from the above description, the optional implementation (2) is obtained by introducing the optical system and by using the first image sensor and the second image sensor to capture the target scene simultaneously. The first dynamic aperture corresponding to the first image sensor that captures the first photo is controlled by the first light transmission function during the first photo. The second dynamic aperture corresponding to the second image sensor that captures the second photo is controlled by the second light transmission function during the second photo. In the process of taking the first and second photos, the third illumination light is emitted by the illumination source and includes the first illumination light. The included first illumination light is reflected by the target scene and reaches the first image sensor via the optical system and the first dynamic aperture. The third illumination light also includes the second illumination light, which is reflected by the target scene and reaches the second image sensor via through the optical system and the second dynamic aperture. Here, it is also necessary to ensure that the first light transmission function is not a constant and/or the second light transmission function is not a constant, and that the first light transmission function is different from the second light transmission function and/or the first light strength function is different from the second light strength function.

It should be noted that the above optional implementation (2) may also include, in addition to the first dynamic aperture and corresponding first image sensor and the second dynamic aperture and corresponding second image sensor, other dynamic aperture and corresponding image sensor. Moreover, the first dynamic aperture and corresponding first image sensor and the corresponding second dynamic aperture and corresponding second image sensor can be any two different dynamic apertures and sensors for generating the depth image of the system. Herein, the first dynamic aperture and the corresponding first image sensor, as well as the second dynamic aperture and the corresponding second image sensor are illustrated as an example.

Optional implementation (3): based on the above optional implementation (2), the optical system used to generate a depth image in the system may include filters. Here, the number of narrow-band filters included in the optical system may be one or more, wherein the filter can separate at least one wavelength belonging to the first preset wavelength set of light and at least one wavelength belongs to the second preset wavelength set of light. The third illumination light in the above optional implementation (2) may include: the first illumination light and the second light, wherein at least one wavelength of the first illumination light belongs to the first preset wavelength set and at least one wavelength of the second light belongs to at least one wavelength belonging to the second preset wavelength set. In addition, the first illumination light is reflected by the target scene and reaches the first image sensor via the filter and the first dynamic aperture; the second illumination light is reflected by the target scene reaches the second image sensor via the filter and the second aperture. In this way, the seventh control operation of the above optional implementation (2) is performed.

Figure 2D:
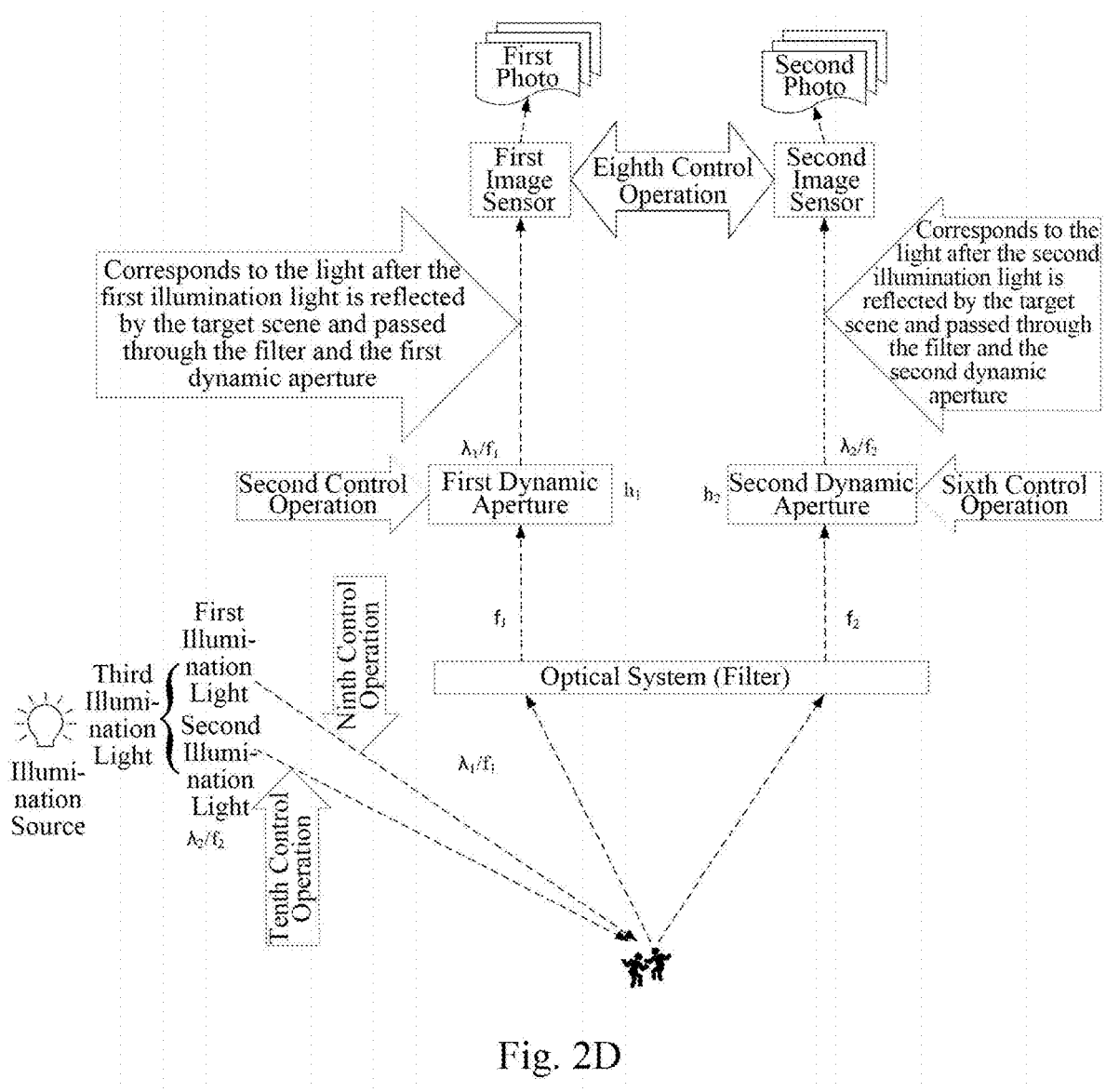
FIG. 2D is a schematic structural diagram of the optical system according to an embodiment of the present disclosure.

For ease of understanding the optional implementation (3), reference is made to FIG. 2D. FIG. 2D shows a diagram of the structure based on an embodiment of an optical system disclosed. In FIG. 2D, the optical system may include at least one filter, at least one filter as discussed above, which can separate at least one wavelength from light belonging to the first preset wavelength set and at least one wavelength to the second preset wavelength set. Depending on the practice, the illumination source, the second dynamic aperture, and the second image sensor can be located on one side of the filter, while the first dynamic aperture and the first image sensor can be located on the other side of the filter. Of course, depending on the needs of practice, the lighting source, the first dynamic aperture, the first image sensor, the second dynamic aperture and the second image sensor can also be located on the same side of the filter. Thus, in the sub-step 2011B the second control operation, the sixth control operation, the ninth control operation, the tenth control operation and the eighth control operation may be performed simultaneously.

The sub-step 2012B will be performed after the sub-step 2011B: the photo captured by the first image sensor is determined as the first photo, and it calibrates the photo space location of the photo captured by the second image sensor to the coordinate system of the first image sensor and then determines the calibrated photo as the second photo.

Because the filter can transmit at least one wavelength of light belonging to the first preset wavelength set of $\lambda_1$, the first illumination light, which has at least one wavelength belonging to the first preset wavelength set of $\lambda_1$ and has the light intensity in line with the first light intensity function $f_1$, is reflected by the target scene and reaches the first image sensor via the filter and the first dynamic aperture. The second illumination light, which includes at least one wavelength belonging to the second preset wavelength set of $\lambda_2$ and the light intensity in line with the second light intensity function $f_2$, is reflected by the target scene and reaches the second image sensor via the filter and the second dynamic aperture. The first dynamic aperture for the first image sensor in the preset exposure time of the light transmission rate in accordance with the first light transmission function $h_1$, the second dynamic aperture for the second image sensor in the preset exposure time of the transmission rate conforms to the second light transmission function $h_2$.

Optional implementation (4): based on the above optional implementation (2), the optical system used to generate a depth image in the system may include polarization plates, wherein the number of polarizing chips may be one or more. The polarization plates are configured to make the light have the first preset polarization state and the second preset polarization state, respectively. The third illumination light includes the first illumination light in the first preset polarization state and the second illumination light in the second preset polarization state. The first illumination light is reflected by the target scene as well as the polarization plate and the first dynamic aperture and then reaches the first image sensor. The second illumination light is reflected by the target scene as well as the polarization plate and the second dynamic aperture and then reaches the second image sensor. In this way, the seventh control operation of the above optional implementation (2) is performed.

In some implementations, the first preset polarization state and the second preset polarization state can be two polarization states perpendicular to each other. In this way, each polarization plate is easier to separate the light from the first preset polarization state and the second preset polarization state, increasing the utilization of the third illumination light emitted by the illumination source.

Figure 2E:
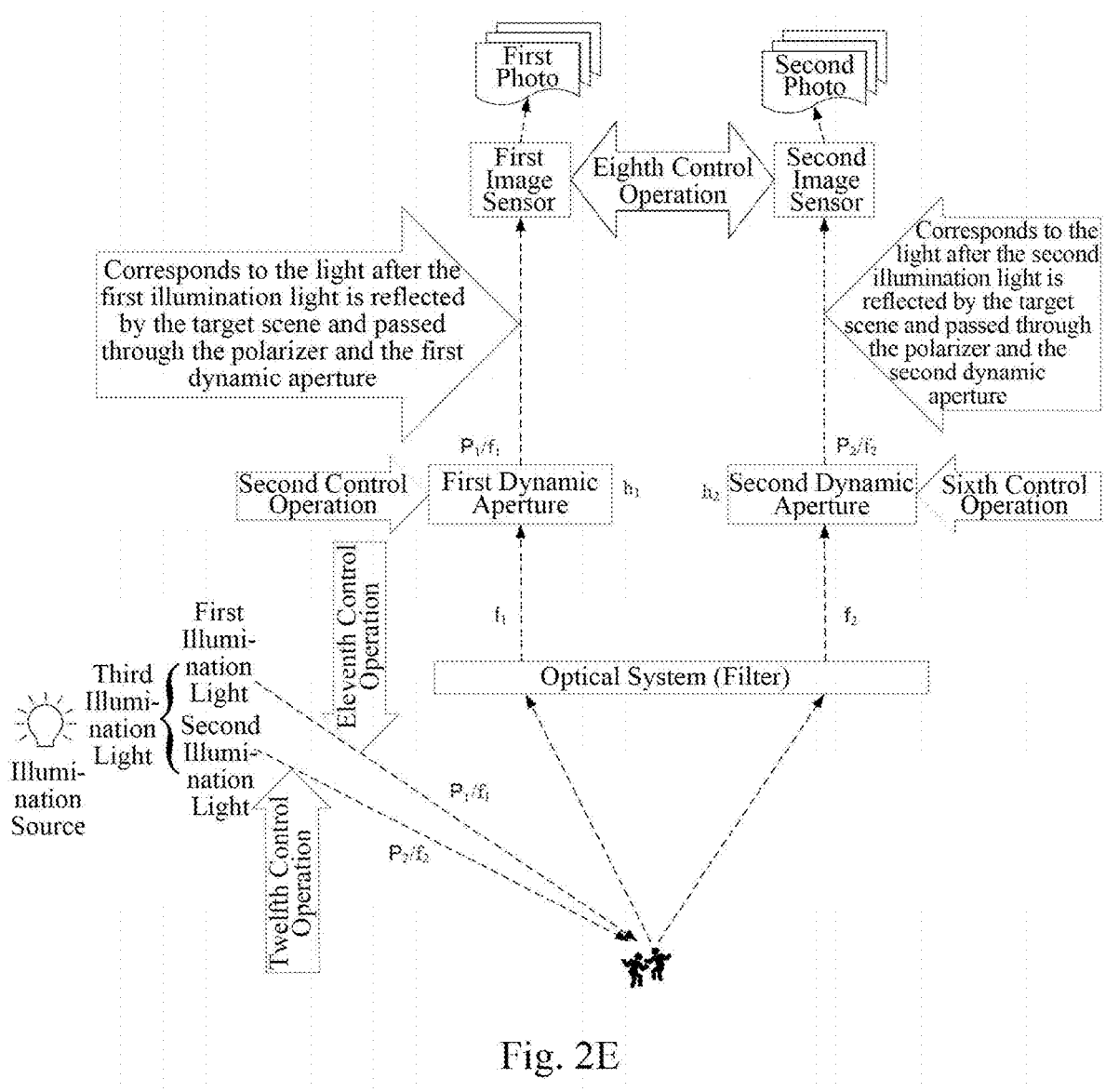
FIG. 2E is a schematic structural diagram of the optical system according to another embodiment of the present disclosure.

For the convenience of understanding the optional implementation (4), reference is made to FIG. 2E, which is a structural diagram based on another embodiment of the optical system disclosed in this disclosed. In FIG. 2E, the optical system may include at least one polarization plate. The polarization plate is configured to separate the light to be the first preset polarization state $P_1$ and the second preset polarization state $P_2$, respectively. Depending on the practice, the illumination source, the first dynamic aperture, and the first image sensor can be located on one side of the polarized sheet, while the second dynamic aperture and the second image sensor can be located on the other side of the polarized plate. Of course, depending on the needs of practice, the illumination source, the first dynamic aperture, the first image sensor, the second dynamic aperture and the second image sensor can also be located on the same side of the polarized film. Thus, the second control operation, the sixth control operation, the eleventh control operation, the twelfth control operation, and the eighth control operation can be performed simultaneously in the sub-step 2011B.

It will perform sub-step 2012B after performing sub-step 2011B: it identifies the photo captured by the first image sensor as the first photo, and calibrates the photo space position of the photo captured by the second image sensor to the coordinate system of the first image sensor, and determines the calibrated photo as the second photo.

Optional implementation (5): based on the above optional implementation (2), the optical system used to generate a depth image in the system may include the first light separation component, the first filter component and the second filter component. The first filter component can transmit the light with at least one wavelength belonging to the first preset wavelength set, and the second filter component can transmit the light with at least one wavelength belonging to the second preset wavelength set. The first light separation component does not have a filter function. The first filter part and the first image sensor are located on the first side of the first light separation component, and the second filter component and the second image sensor are located on the second side of the first light separation.

The third illumination light may include: a first illumination light and a second illumination light, wherein the first illumination light has at least one wavelength belonging to the first preset wavelength set and has the light strength in line with the first light strength function and the second illumination light has a wavelength belonging to the second preset wavelength set and has the light strength in line with the second light strength function.

The first illumination light is reflected by the target scene and reaches the first image sensor via the first light separation component, the first filter component and the first dynamic aperture. The second illumination light is reflected by the target scene and reaches the second image sensor by the first light component, the second filter part and the second dynamic aperture. In this way, the seventh control operation of the above optional implementation (2) is performed.

Figure 2F:
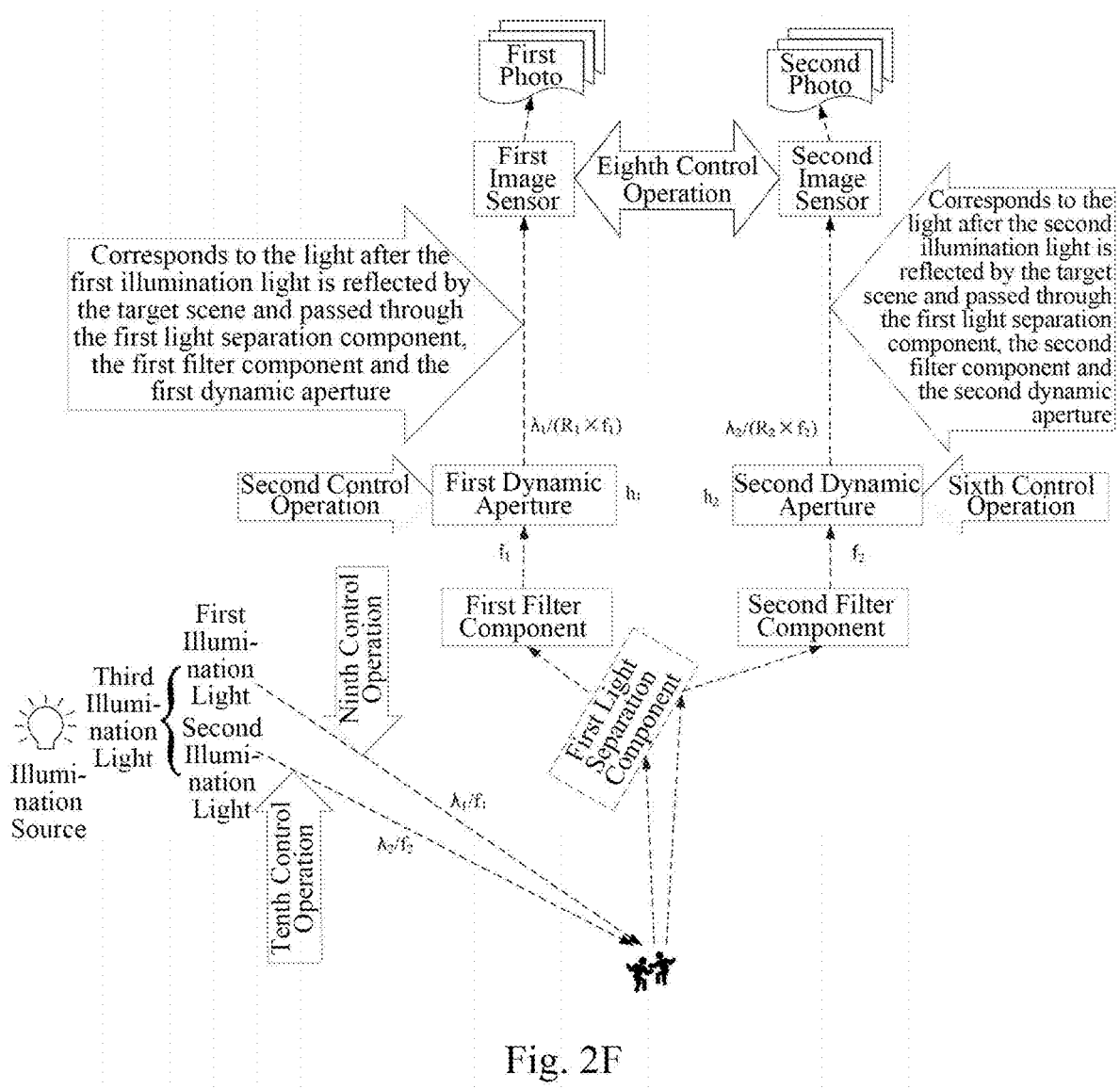
FIG. 2F is a schematic structural diagram of the optical system according to another embodiment of the present disclosure.

For the convenience of understanding the optional implementation (5), reference is made to FIG. 2F, which is based on a diagram of the structure of another embodiment of the optical system disclosed in this disclosed. In FIG. 2F, the first filter component, the first dynamic aperture and the first image sensor are located on one side of the first light separation component, and the target scene, the second dynamic aperture, the second filter component, and the second image sensor are located on the other side of the first light separation component. The first light separation component does not have a filter function. The first filter component can transmit at least one wavelength of light belonging to the first preset wavelength set of $\lambda_1$, and the second filter element can transmit at least one wavelength of light belonging to the second preset wavelength set of $\lambda_2$. Thus, at step 201, the tenth control operation, the second control operation, the sixth control operation and the ninth control operation are performed simultaneously to perform the sub-step 2011B.

It should be noted that the first dynamic aperture and the second dynamic aperture here can be either two identical dynamic apertures or the same dynamic aperture. The first light transmission function $h_1$ can be the same as the second light transmission function $h_2$, or it can be different. When the first dynamic aperture is the same as the second dynamic aperture, and when the first light transmission function $h_1$ is the same as the second light transmission function $h_2$, the second control operation and the sixth control operation only need to perform one of them. When the first light transmission function $h_1$ is different from the second light transmission function $h_2$, although there is only one dynamic aperture (i.e., the first dynamic aperture or the second dynamic aperture), because the light can be composed of multiple wavelengths of light, different light transmission functions can be applied to the different light with different wavelengths. For example, it is possible to control the first dynamic aperture simultaneously, such that in a preset exposure time, the transmission rate of light with the wavelength belonging to the first preset wavelength set $\lambda_1$ complies with the first light transmission function $h_1$, and the transmission rate of light with the wavelength belonging to the second preset wavelength set $\lambda_2$ complies with the second light transmission function $h_2$. Of course, this requires hardware for the first dynamic aperture to support this operation, for example, the F-P etalon or The Pockels cell containing nonlinear crystals can support this operation.

It should also be noted that, the first illumination light passes through the first light separation component and thus reaches the first filter part and the second filter component in accordance with the first preset separation ratio $R_1$ and the second preset separation ratio $R_2$, wherein the first illumination light has wavelength belonging to the first preset wavelength set $\lambda_1$ and the light intensity in line with the first light intension function f1.

Similarly, the second illumination light passes through the first light separation component and thus reaches the first filter part and the second filter component, in accordance with the first preset separation ratio $R_1$ and the second preset separation ratio $R_2$, wherein the second illumination light has wavelength belonging to the second preset wavelength set $\lambda_2$ and the light intensity in line with the second light intension function $f_2$.

Because the first filter component can transmit the light having the wavelength belongs to the first preset wavelength set $\lambda_1$, the second filter component can transmit the light having the wavelength belongs to the second preset wavelength set $\lambda_2$, then the light intensity to the first image sensor for the wavelength belongs to the first preset wavelength set $\lambda_1$ conforms the light intensity of $(R_1*f_1)$, the light intensity to the second image sensor having the wavelength belongs to the second preset wavelength set $\lambda_2$ conforms the light intensity of $(R_2*f_2)$. In practice, the sum of the first preset light separation ratio and the second preset separation ratio is any positive number greater than 0 less than or equal to 1.

Optional implementation (6): Optical systems in systems used to generate depth images may include the second and third filter components. Wherein, the second light separation component can be configured to split and transmit light having at least one wavelength belonging to the first preset wavelength set. The third filter component can be configured to transmit light that belongs to at least one wavelength belonging to the second preset wavelength set. Here, the first dynamic aperture and the first image sensor can be located on the first side of the second light separation component, the target scene, the third filter component, the second dynamic aperture and the second image sensor can be located on the second side of the second light separation component.

The third illuminated light may include: 1) the first illumination light having at least one wavelength belonging to the first preset wavelength set and the light intensity in line with the first illumination light intensity function, and 2) the second illumination light having at least one wavelength belongs to the second preset wavelength set and the light intensity in line with the second illumination light intensity function.

The first illuminated light is reflected by the target scene; then reaches the first image sensor via the second light separation component and the first dynamic aperture. The second illumination light is reflected by the target scene; then reaches the second image sensor via the second light separation component, the third filter component and the second dynamic aperture.

By using the process of controlling the system with light splitting components and filters as described in the subject disclosure of claim 7 of the present invention, the third light with two wavelengths may be emitted.

Figure 2G:
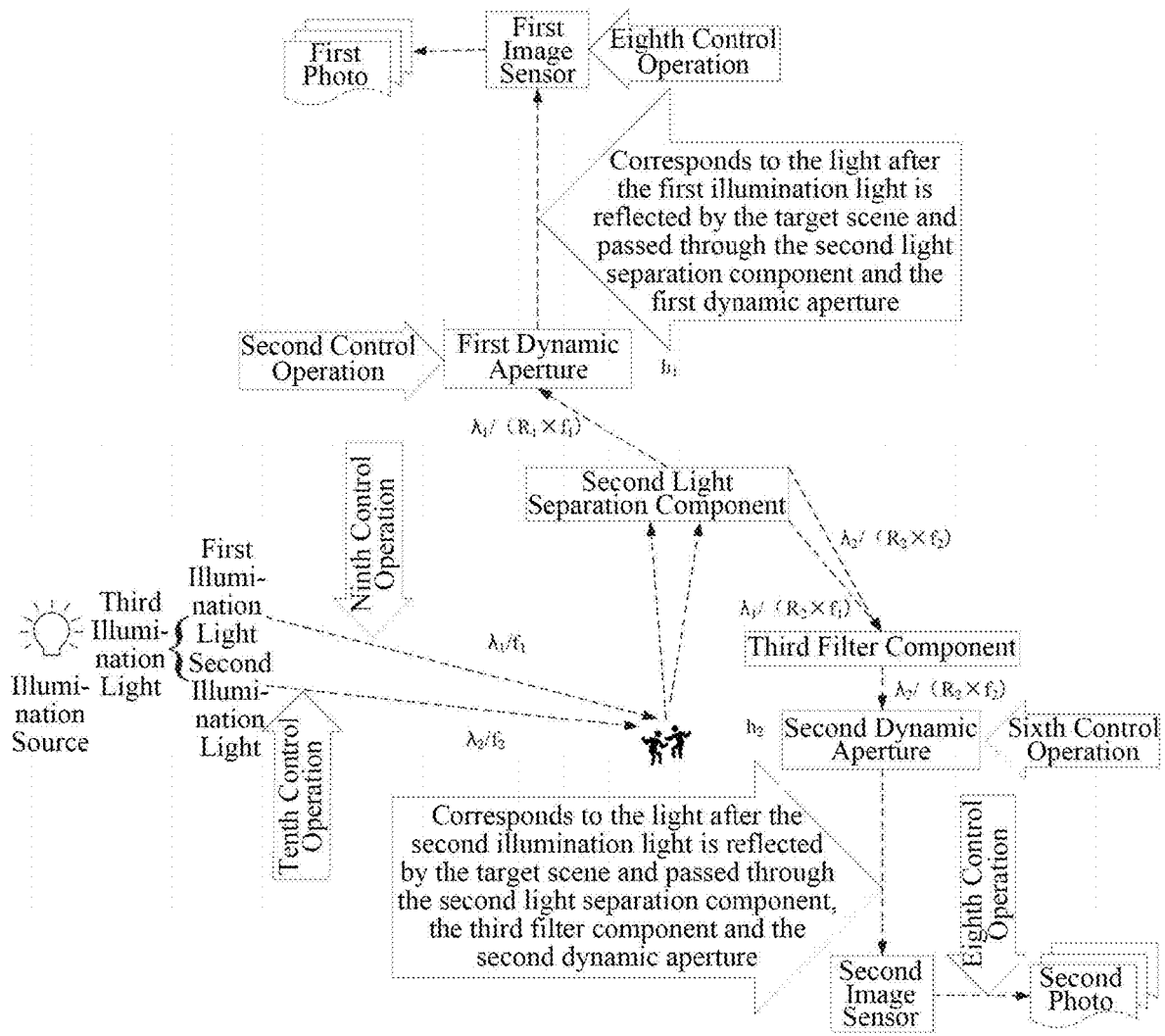
FIG. 2G is a schematic structural diagram of the optical system according to still another embodiment of the present disclosure.

For the convenience of understanding the optional implementation (6), reference is made to FIG. 2G, which is based on the structure diagram of an embodiment of the optical system disclosed in this disclosed. In FIG. 2G, the first dynamic aperture and first image sensor are located on one side of the second separation component, and the target scene, the third filter component, the second dynamic aperture and the second image sensor are located on the other side of the second separation component. The second light separation component can split and transmit light having at least one wavelength belongs to the first preset wavelength set, while the third filter component can transmit at least one wavelength of light belonging to the second preset wavelength set $\lambda 2$. The step 201 may simultaneously perform the second control operation, the sixth control operation, the ninth control operation, the tenth control operation, and the eighth control operation as shown in FIG. 2G to perform the sub-step 2011B.

It performs sub-step 2012B after performing sub-step 2011B: it identifies the photo captured by the first image sensor as the first photo, and calibrate the photo space position of the photo captured by the second image sensor to the coordinate system of the first image sensor, and determines the calibrated photo as the second photo.

It should be noted that the first dynamic aperture and the second dynamic aperture here can be either two identical dynamic apertures or the same dynamic aperture. The light transmission function $h_1$ can be the same as the second light transmission function $h_2$, or it can be different. When the first dynamic aperture is the same as the second dynamic aperture, and when the first light transmission function $h_1$ is the same as the second light transmission function $h_2$, the second control operation and the sixth control operation only need to perform one of them. When the first light transmission function $h_1$ is different from the second light transmission function $h_2$, although there is only one dynamic aperture (i.e., the first dynamic aperture or the second dynamic aperture), because the light can be composed of multiple wavelengths of light, different light transmission functions can be applied to the different light with different wavelengths. For example, it is possible to control the first dynamic aperture simultaneously, such that in a preset exposure time, the transmission rate of light with the wavelength belonging to the first preset wavelength set $\lambda_1$ complies with the first light transmission function $h_1$, and the transmission rate of light with the wavelength belonging to the second preset wavelength set $\lambda_2$ complies with the second light transmission function $h_2$. Of course, this requires hardware for the first dynamic aperture to support this operation, for example, the F-P etalon or the Pockels cell containing nonlinear crystals can support this operation.

It should also be noted that, since the second light separation component has both the beam splitting function and the filter function, the first illumination light, including at least one wavelength belonging to the first preset wavelength set $\lambda_1$ and light intensity in accordance with $f_1$, can pass through the second filter component with the first preset fraction ratio R1 irradiated to the first dynamic aperture, then the light intensity of the light to the first image sensor having the wavelength preset wavelength set $\lambda_1$ conforms to $(R_1*f_1)$.

The first illumination light, having at least one wavelength belonging to the first preset wavelength set $\lambda_1$ and light intensity $f_1$, can be irradiated to the third filter component by the second light separation component with the second preset fractional ratio $R_2$, and the second illumination having at least one wavelength belonging to the second preset wavelength set $\lambda_2$ and light intensity $f_2$, is also irradiated to the third filter component by the second preset fraction already. Since the third filter component can transmit light that belongs to the second preset wavelength set $\lambda_2$, the second image sensor gets the light that belongs to the second preset wavelength set $\lambda_2$ and light intensity conforming ($R_2*f_2$). In practice, the sum of the first preset light separation ratio and the second preset separation ratio is any positive number greater than 0 less than or equal to 1.

Optional implementation (7): at least one set of dynamic apertures and corresponding image sensors in the system used to generate depth images may include the first dynamic aperture and the corresponding first image sensor.

Here, the first image sensor can be an image sensor array in which the pixel unit of the first image sensor and the pixel unit of the second image sensor are alternately arranged.

Figure 2H:
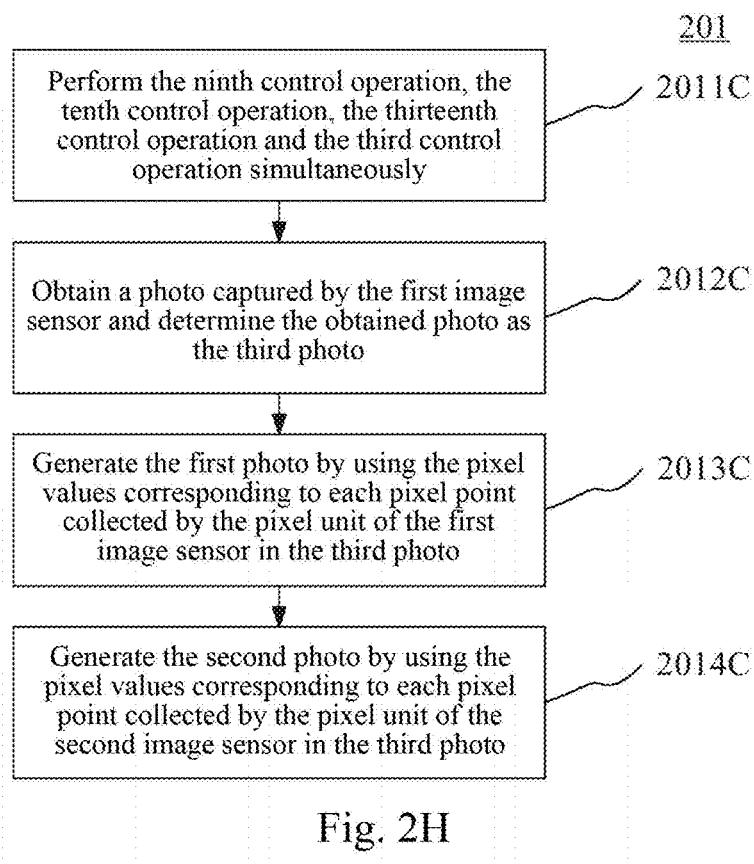
FIG. 2H is a breakdown flowchart of step 201 according to still another embodiment of the present disclosure.

The first image sensor pixel unit can be provided with a filter that transmits at least one wavelength of light that belongs to the first preset wavelength set, while the second image sensor pixel unit can be provided with a filter that transmits at least one wavelength of light that belongs to the second preset wavelength set. In this way, step 201 can include the sub-step 2011C to sub-step 2014C as shown in FIG. 2H. Refer to FIG. 2H, which shows the decomposition flow chart of another embodiment in accordance with step 201 disclosed here.

In Sub-step 2011C, it uses the process of alternating two image sensor pixel units as described in the subject disclosure of claim 8 of the present invention to acquire the first photo, the second photo, and the third photo.

In the sub-step 2012C, photos captured by the first image sensor is obtained and the obtained photos is identified as the third photo.

In the sub-step 2013C, the first photo is generated with the pixel value of each pixel that should be captured by the pixel unit of the first image sensor.

In sub-step 2014C, a second photo is generated with the pixel value of each pixel that should be captured by the pixel unit of the second image sensor.

As can be seen from the above description, in the optional implementation (7), the first image sensor pixel unit and the second image sensor pixel unit in the first image sensor are alternated, and the first image sensor pixel unit is provided with filter to transmit at least one wavelength of light belonging to the first preset wavelength set, and the second image sensor pixel unit is provided with filter to transmit at least one wavelength belongs to the second wavelength preset wavelength set. Therefore, only one sensor image shooting is needed to get the first photo and the second photo.

Figure 2I:
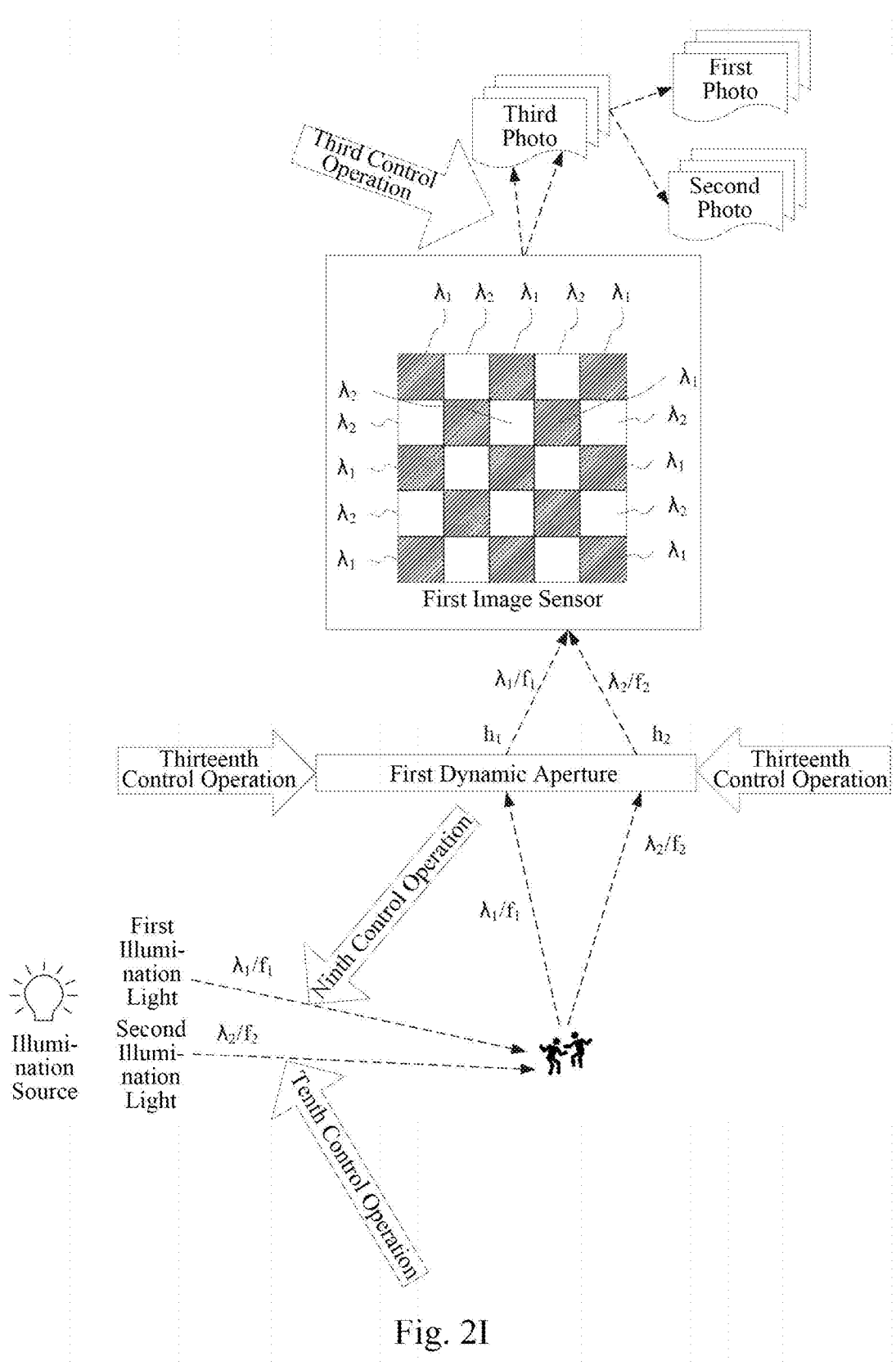
FIG. 2I is a schematic structural diagram of at least one set of dynamic aperture and corresponding image sensor according to an embodiment of the present disclosure.

For the convenience of understanding the optional implementation (7), reference is made to FIG. 2I, which is a structural diagram of an embodiment based on at least one set of dynamic apertures and corresponding image sensors disclosed herein. In FIG. 2I, the lighting source, the first dynamic aperture, and the first image sensor are shown. The indicative in FIG. 2I shows the first image sensor, including 5*5 image sensor array, wherein, the first image sensor pixel unit indicated in the shadow is provided with a light filter to transmit at least one wavelength belonging to the first preset wavelength set $\lambda_1$, and the second image sensor pixel unit indicated non-shadowed is provided with a light filter to transmit at least one of the wavelength of the second wavelength set of $\lambda_2$.

In this way, step 201 can include performing the following sub-steps:

The sub-step 2011C has been described previously.

In the sub-step 2012C, the photos captured by the first image sensor are obtained and identified as the third photo.

In the sub-step 2013C, the first photo is generated with the pixel value of each pixel that should be captured by the pixel unit of the first image sensor.

In the sub-step 2014C, the second photo is generated with the pixel value of each pixel that should be captured by the pixel unit of the second image sensor.

It should be noted that the first light transmission function here is the same as the second light transmission function, while the first light intensity function $f_1$ is different from the second light intensity function $f_2$.

Wherein, the ninth control operation, the tenth control operation, the thirteenth control operation, and the third control operation are performed as shown in FIG. 2I.

Figure 2J:
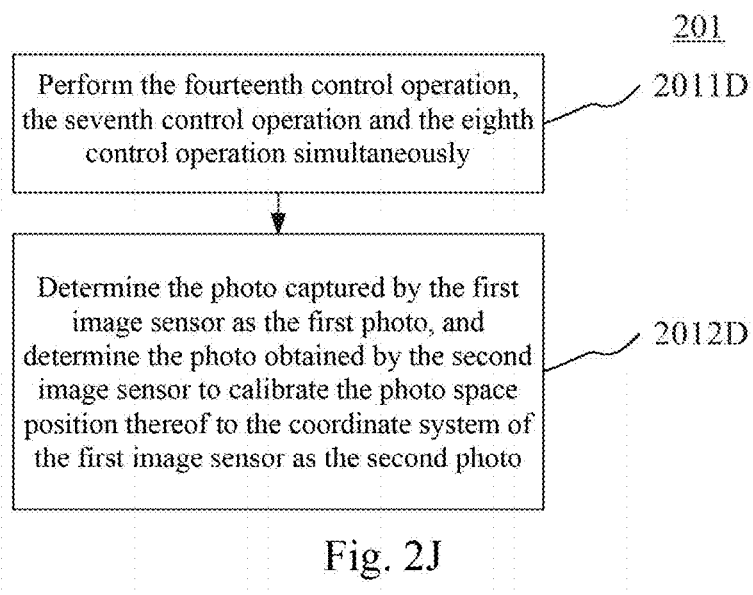
FIG. 2J is a breakdown flowchart of step 201 according to still another embodiment of the present disclosure.

Optional implementation (8): At least one set of dynamic apertures and corresponding image sensors in the system used to generate depth images may include the first dynamic aperture and corresponding first image sensors, as well as the second image sensor. The first image sensor and the illumination source are located on the first side of the first dynamic aperture, and the second image sensor is located on the second side of the first dynamic aperture. In this way, step 201 can include the sub-step 2011D and sub-step 2012D as shown in FIG. 2J:

In the sub-step 2011D, the fourteenth control operation, the seventh control operation and the eighth control operation are performed simultaneously.

Figure 2K:
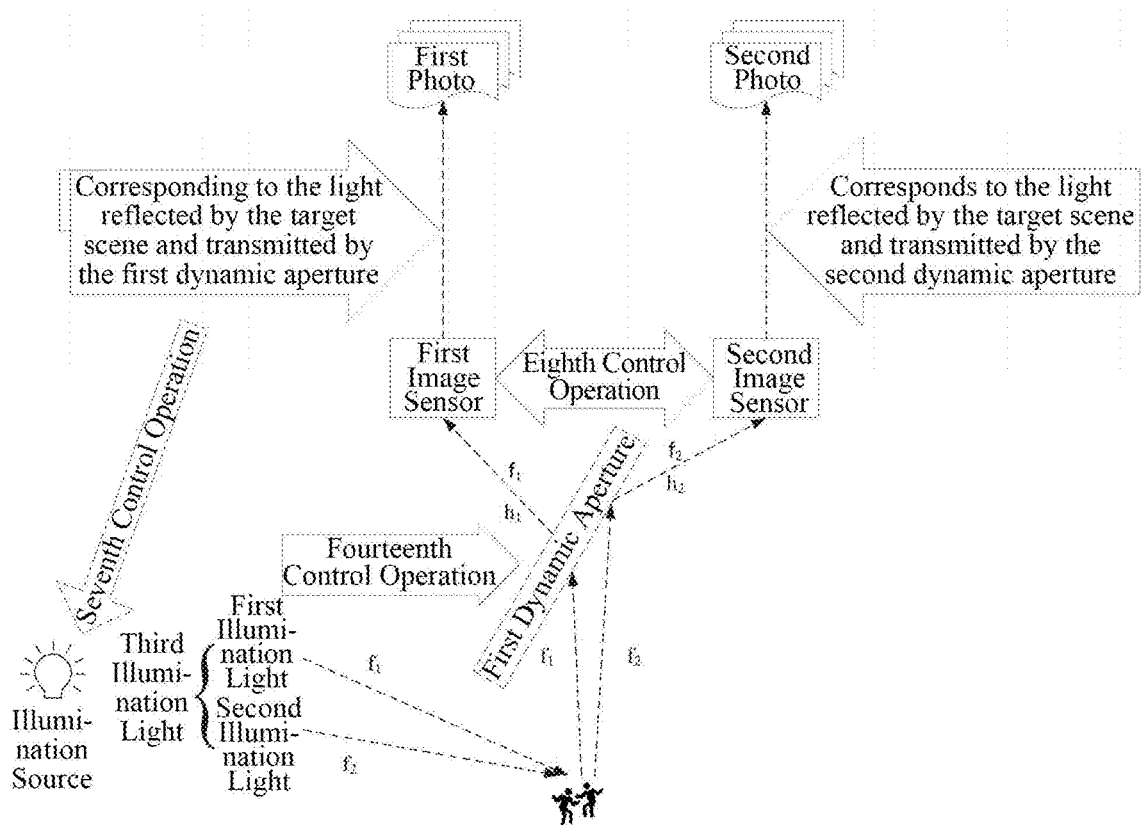
FIG. 2K is a schematic structural diagram of at least one set of dynamic aperture and corresponding image sensor according to another embodiment of the present disclosure.

For the convenience of understanding the optional implementation (8), reference is made to FIG. 2K. FIG. 2K is a structural diagram of at least one set of dynamic apertures and corresponding image sensors in this disclosure. As can be seen from FIG. 2K, the first image sensor is located on one side of the first dynamic aperture, and the second image sensor and the target scene are located on the other side of the first dynamic aperture. In this way, step 201 can include performing the following sub-steps:

In the sub-step 2011D: the fourteenth control operation, the seventh control operation and the eighth control operation are simultaneously performed.

In the sub-step 2012D, the photo captured by the first image sensor is identified as the first photo, and the photo space position of the photo captured by the second image sensor is calibrated to the coordinate system of the first image sensor, and the calibrated photo is determined as the second photo.

As can be seen from the above description, the first and second photos are different photos obtained by two different image sensors taking the target scene simultaneously. Furthermore, different light intensity functions and/or different light transmission functions are used in the first and second photos, i.e. the first illumination light intensity function is different from the second illumination light intensity function and/or the first illumination light transmission function is different from the second illumination light transmission function.

The above optional implementations (1-8) gives the specific implementation of different steps 201, but the present application does not limit which implementation method shall be used.

Figure 2L:
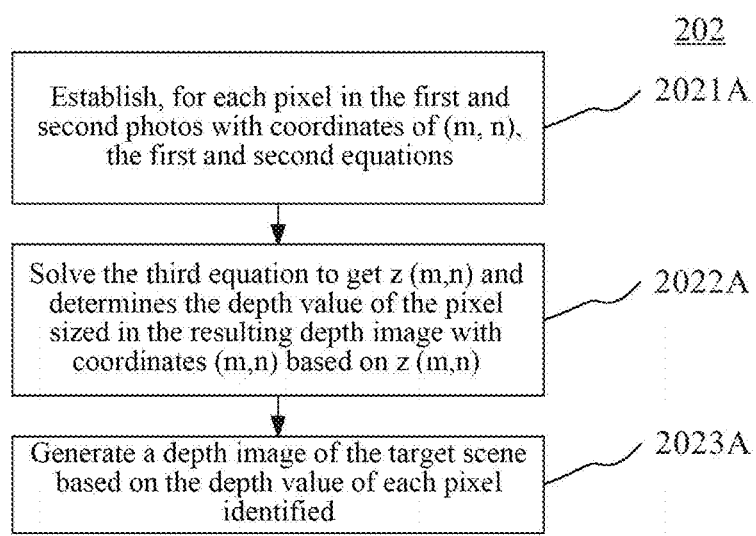
FIG. 2L is a breakdown flowchart of step 202 according to an embodiment of the present disclosure.

Optional implementation (9): based on any of the above Optional implementation (1-8), step 202 may include the sub-step 2021A to sub-step 2023A as shown in FIG. 2L. Reference is made to FIG. 2L, which shows a breakdown flow chart based on an embodiment of step 202 disclosed here.

In the sub-step 2021A, for each pixel in the first and second photos with coordinates of (m, n), the first and second equations are established.

The first equation is:

$$S_1(m, n) = R(m, n) \int_{t_0}^{t_0+\tau} f_1\left(t - t_d(m, n) - \frac{z(m, n)}{c}\right) h_1(t) dt \quad \text{(Equation 1)}$$

where,

R (m, n) is the reflectivity of the area corresponding to the pixel point with coordinates (m, n) in the target scene, $f_1$ is the first light intensity function, t is the time variable, $$f_1\left(t - t_d(m, n) - \frac{z(m, n)}{c}\right)$$

is the light intensity at time t of the first illuminating light after it arrives the target scene from the illuminating source at the area corresponding to the pixel with the coordinate (m, n) in the first photo and then returns to the first image sensor, $t_d$ (m, n) is the length of time for the light to reach the area corresponding to the pixel point with coordinates (m, n) in the target scene from the position of the illumination source, $$t_d(m, n) = \frac{\sqrt{z(m, n)^2 + L^2 - 2 \cdot L \cdot z(m, n) \cdot \cos \alpha}}{c},$$

c is the speed of light, z(m, n) is the distance between the area in the target scene corresponding to the pixel with the coordinate (m, n) in the generated depth image and the first image sensor, and L is the distance between the first image sensor and the illumination source, and α is the angle between the first side the second side.

The second equation is:

$$S_2(m, n) = R(m, n) \int_{t_0}^{t_0+\tau} f_2\left(t - t_d(m, n) - \frac{z(m, n)}{c}\right) h_2(t) dt \quad \text{(Equation 2)}$$

where, $f_2$ is the second light intensity function, $$f_2\left(t - t_d(m, n) - \frac{z(m, n)}{c}\right)$$

is the light intensity at time t of the second illumination light after it arrives the target scene from the illumination source at the area corresponding to the pixel with the coordinates (m, n) in the photo and then returns to the first image sensor, $h_2$ is the second light intensity function, and $S_2$ (m, n) is the pixel value of the pixel in the second photo with coordinates (m, n).

Figure 2M:
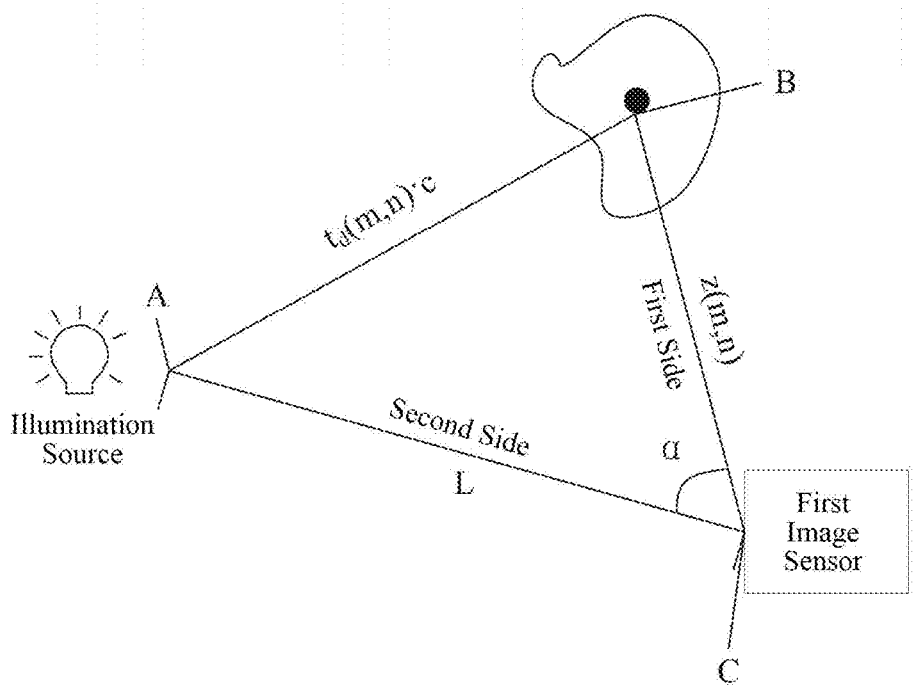
FIG. 2M is a schematic diagram of the calculation principle of $t_d(m,n)$ according to an embodiment of the present disclosure.

For ease of understanding, please refer to FIG. 2M. FIG. 2M shows a diagram of an embodiment based on the calculation principle of the $t_d$(m,n) disclosed here. As shown in FIG. 2M, point A is the location of the lighting source, point B is the area of the pixel corresponding to the coordinates (m, n) in the target scene, point C is the location of the first image sensor, the first side is the edge CB, the second side is the edge CA, L is the length of the edge CA. Alpha is the top angle corresponding to the apex C of the triangle ABC, and the angle of edge CB and edge CA. The length of the edge AB is $t_d$(m,n)·c, which is the distance between the illumination source and the area in the target scene corresponding to the pixel at the coordinates (m, n). The length of edge BC is z(m, n) and the length of edge AC is L, and the following formula is obtained by triangular knowledge:

$$z(m,n)^2 + L^2 = (t_d(m,n) \cdot c)^2 + 2 \cdot L \cdot z(m,n) \cdot \cos \alpha$$

By the above formula, it can obtain:

$$t_d(m, n) = \frac{\sqrt{z(m, n)^2 + L^2 - 2 \cdot L \cdot z(m, n) \cdot \cos \alpha}}{c}.$$

Understandably, when the lighting source and the first image sensor are in the same location, $$t_d(m, n) = \frac{z(m, n)}{c}.$$

Then, according to the first equation and the second equation, it gets the third equation. The third equation is:

$$\frac{S_1(m, n)}{S_2(m, n)} = \frac{\int_{t_0}^{t_0+\tau} f_1\left(t - t_d(m, n) - \frac{z(m, n)}{c}\right) h_1(t) dt}{\int_{t_0}^{t_0+\tau} f_2\left(t - t_d(m, n) - \frac{z(m, n)}{c}\right) h_2(t) dt} \quad \text{(Equation 3)}$$

the third equation is solved to obtain z(m, n), and the depth value of the pixel with the coordinate (m, n) in the generated depth image is determined according to z(m, n), where $S_1$ (m, n), $S_2$ (m, n), $h_1$, $h_2$, $t_0$, τ, $f_1$, $f_2$, the speed of light c, L and a are all known.

It should be noted that the pixel distribution of the first and second photos can be the same. Understandably, if the pixel distribution of the first photo and the second photo is different, the pixel distribution of the first photo and the second photo can be equally distributed by up-sampling (for example, interpolation) or under-sampling process. Therefore, the above equations can be established for each pixel with coordinates of (m,n).

In the sub-step 2022A, it solves the third equation to get z(m, n) and determines the depth value of the pixel sized in the resulting depth image with coordinates (m, n) based on z(m, n).

Here, $S_1$ (m, n), $S_2$ (m, n), $h_1$, $h_2$, $t_0$, τ, $f_1$, $f_2$, speed of light c, L and α are all known.

Here, when generating a depth image, it first determines the pixel distribution of the resulting depth image by the pixel distribution of the first and second photos. For example, when the first photo and the second photo are distributed in M×N, the first photo and the second photo are both horizontal with M pixels and n pixels in the portrait.

Then, for each pixel with (m, n), it determines the depth value of the pixel based on z(m, n). For example, z(m, n) can be directly determined as the depth value of the pixel. For example, z(m, n) can also be naturalized into the preset value range, and the value obtained after normalization can be determined as the depth value of the pixel, for example, can be naturalized to zero to 255 integers.

In the sub-step 2023A, a depth image of the target scene is generated based on the depth value of each pixel identified.

The pixel distribution of the depth image is determined, and the depth value of each pixel is determined, i.e. the depth image of the target scene can be generated.

It should be noted that the optional implementation (9) indicates how the depth image of the target scene is generated based on the first photo, the first shooting configuration information, the second photo and the second shooting configuration information, in the case of only two photos, i.e. the first photo and the second photo configuration information. In practice, at least one set of dynamic apertures and corresponding image sensors can be used to capture more photos of the target scene, and to establish more equations, as long as the number of unknown $z(m, n)$ is introduced into the established equation, more $z(m, n)$ can be obtained by solving the equation, and the final $z(m, n)$ can be determined by solving the multiple $z(m, n)$. For example, you can capture the mean of multiple $z(m, n)$ as the final $z(m, n)$.

Understandably, the more photos captured, the more equations are created, and the more accurate the $z(m, n)$ resulting from the final solution.

Optional implementation (10): based on any of the above optional implementations (1-8), the above-mentioned executive entity performs the second control operation and the fifteenth control operation before the execution of step 201.

From the above description of any optional implementation (1-8), as well as the above description of the second control operation and the fifteenth control operation, it can be known that, the background photo and the first photo were captured by the first image sensor, and in the process of taking the background light photo and the first photo, the transmission rate of the first dynamic aperture is controlled in accordance with the first transmission function during the preset exposure time. The difference between the background light photo and the first photo is that there is no illumination source in the background photo to illuminate the target scene, and during the first photo shooting there is a first photo to control the lighting source during the preset exposure time.

Based on the above-mentioned operations, the background light photo is determined prior to step 201, step 202 can be performed as follows: the depth image of the target scene is generated based on the background light photo, the first photo, the first shooting configuration information, the second photo and the second shooting configuration information.

Understandably, with the background light photo, the first photo and the second photo, at least three equations can be established, and the established three equations can be introduced in the unknown, that is, the resulting depth image of each pixel in the target scene corresponds to the region and the distance of the image sensor, and various implementation methods may be used to solve the equations to obtain the above distance, and based on the obtained distance to generate a depth image of the target scene.

Figure 2N:
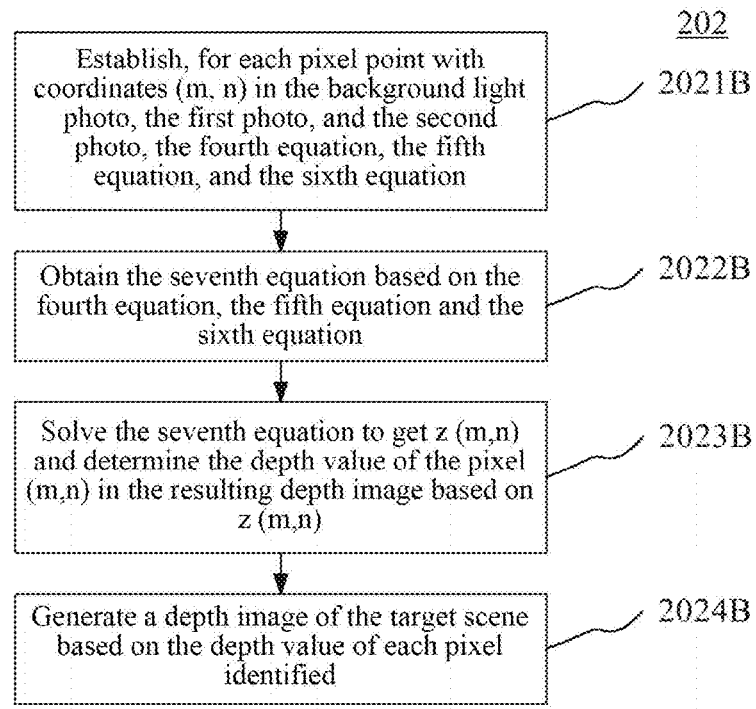
FIG. 2N is a breakdown flowchart of step 202 according to an embodiment of the present disclosure.

Optional implementation (11): based on the above optional implementation (10), step 202 may comprise the sub-step 2021B to sub-step 2024B as shown in FIG. 2N, which shows a breakdown flow chart based on an embodiment of step 202 disclosed in this disclosure:

In the sub-step 2021B, for the background light photo, the first photo, and the second photo coordinates $(m, n)$ of each pixel point, it establishes the fourth equation, the fifth equation, and the sixth equation.

Specific understanding of the above description can be referred to in the optional implementation (9) about the relevant description of FIG. 2M, and thus the discussion thereof is omitted here.

$h_1$ is the first illumination light transmission function, $t_0$ for the exposure start time, $r$ the preset exposure duration.

$S_1 (m, n)$ is the pixel value of a pixel with coordinates (m, n) in the first photo.

In the sub-step 2022B, the seventh equation is obtained based on the fourth equation, the fifth equation and the sixth equation.

Where the fourth equation is:

$$S_b(m,n) = P_0(m,n) \cdot \int_{t_0}^{t_0+\tau} h_1(t)dt \quad \text{(Equation 4)}$$

Among them, $S_b(m,n)$ is the pixel value of the pixel with coordinates (m,n) in the background light photo, and $P_0(m, n)$ is the light intensity of the area corresponding to the pixel of the target scene under the background light with coordinates $(m, n)$, $h_1$ is the first illumination light transmission function, $t$ is the time variable, $t_0$ is the exposure start time, and $\tau$ is the preset exposure time.

The fifth equation is:

$$S_1(m, n) = \quad \text{(Equation 5)}$$
$$S_b(m, n) + R(m, n) \int_{t_0}^{t_0+\tau} f_1\left(t - t_d(m, n) - \frac{z(m, n)}{c}\right) h_1(t)dt$$

The sixth equation is:

$$S_2(m, n) = S_b(m, n) \frac{\int_{t_0}^{t_0+\tau} h_2(t)dt}{\int_{t_0}^{t_0+\tau} h_1(t)dt} + \quad \text{(Equation 6)}$$
$$R(m, n) \int_{t_0}^{t_0+\tau} f_2\left(t - t_d(m, n) - \frac{z(m, n)}{c}\right) h_2(t)dt$$

A seventh equation is obtained according to the fourth equation, the fifth equation, and the sixth equation, and the seventh equation is:

$$\frac{S_1(m, n) - S_b(m, n)}{S_2(m, n) - S_b(m, n) \frac{\int_{t_0}^{t_0+\tau} h_2(t)dt}{\int_{t_0}^{t_0+\tau} h_1(t)dt}} = \quad \text{(Equation 7)}$$
$$\frac{\int_{t_0}^{t_0+\tau} f_1\left(t - t_d(m, n) - \frac{z(m, n)}{c}\right) h_1(t)dt}{\int_{t_0}^{t_0+\tau} f_2\left(t - t_d(m, n) - \frac{z(m, n)}{c}\right) h_2(t)dt}$$

In the sub-step 2023B, it solves the seventh equation to get $z(m,n)$ and determine the depth value of the pixel $(m, n)$ in the resulting depth image based on $z(m,n)$.

Here, $S_b(m, n)$, $S_1(m, n)$, $S_2(m, n)$, $h_1$, $h_2$, $t_0$, $\tau$, $f_1$, $f_2$, speed of light $c$, $L$, and $\alpha$ are all known.

Here, how to determine the depth value of the pixels in the resulting depth image $(m, n)$ according to $z(m, n)$, can be referred to the relevant description in the sub-step 2022A of the above Optional implementation (9) and will not be repeated here.

In the sub-step 2024B, it generates a depth image of the target scene based on the depth value of each pixel identified.

The pixel distribution of the depth image is determined, and the depth value of each pixel is determined, i.e. the depth image of the target scene can be generated.

It should be noted that, although the first illumination light transmission function is used to characterize the relationship between the light transmission of the dynamic aperture of the image sensor that took the first photo and time, in practice, the first illumination light transmission function can be related to the coordinates of each pixel in the first photo. In other words, for each pixel in the first photo, there is a first light transmission function corresponding to the pixel, and the first illumination light transmission function corresponding to that pixel is used to characterize the relationship between the light transmission of the image sensor pixel unit that took the first photo and time.

For ease of description, the above description mentions only the first illumination light transmission function used to characterize the correspondence between the light transmission of the image sensor that took the first photo with the dynamic aperture of the first photo and time. Similarly, the above description is also applied to the second illumination light transmission function.

Similarly, although the first illumination light intensity function is used to characterize the correspondence between the time and the light intensity of light emitted by the light source to the target scene when the first photo is captured, in practice, however, the first illumination light-strength function can be related to the area in the target scene corresponding to each pixel in the first photo. In other words, for each pixel in the first photo, there is a first light intensity function corresponding to the pixel, and the first illumination light intensity function corresponding to the pixel is used to characterize the correspondence between the light intensity of the light emitted by the illumination source to the area of the target scene corresponding to the pixel when the first photo is captured and time. For ease of description, the description above mentions only the first illumination light intensity function used to characterize the correspondence between the light intensity of the light emitted by the light source to the target scene when the first photo was captured and time. Similarly, the above description is also applied to the second illumination light intensity function.

Optional implementation (12): the dynamic aperture of the system used to generate a depth image, can be an image enhancer. In practice, the transmission of the dynamic aperture, exposure start time, and exposure termination time can be controlled by adjusting the voltage of an image enhancer to achieve different light transmission functions (e.g., first light transmission function, second light transmission function).

Optional implementation (13): the dynamic aperture in the system used to generate deep images can be a Fabry-Pérot interferometer containing nonlinear crystals. In practice, the transmittance of the dynamic aperture, exposure start time, and exposure termination time can be controlled by regulating the voltage of the Fabry-Pérot interferometer containing nonlinear crystals to achieve different light transmission functions (e.g., first light transmission function, second light transmission function).

Optional implementation (14): the above executive entity can also perform step 202 after the following steps 203, in which a 3D model of the target scene is generated based on the first photo, second photo, and depth image.

Here, the above-mentioned executors can use various implementation methods to generate a 3D model of the target scene based on the first and second photos obtained in step 201 and the depth images generated in step 202.

When a depth image is an image of a pixel value that includes only one depth value channel per pixel, the above-mentioned executing entity can generate a 3D model of the target scene based on the first photo and depth image; A three-dimensional model of the target scene is generated based on the photo and the depth image with a higher pixel mean in the first photo and the second photo. Either way, the above implementation generates a 3D model based on an image with a color value channel and an image with a depth value channel.

When a depth image is an image of each pixel that includes both the pixel value of the color value channel and the pixel value of the depth value channel, the above-mentioned executive entity can directly generate a three-dimensional model of the target scene with the depth image, because the depth image itself already includes the color value channel and the depth value channel.

In practice, the pixel distribution of the first photo, second photo, and depth image generated in step 201 can be the same, i.e. there is a one-to-one correspondence between the pixels in the first photo, second photo, and depth image generated in step 202. In other words, if the pixel distribution of the first photo, second photo, and depth image generated in step 201 is different, the above performing subject can also assign the first photo, second photo, and depth image to the same pixel distribution by up-sampling or down-sampling, and get the first photo, second photo, and depth image with the same pixel distribution.

It should be noted that generating a 3D model based on images with color-value channels with the same pixel distribution and depth-value channels is an existing technique that has been widely studied and applied at present and will not be repeated here. For example, face notation, entity representation, implicit representation, hierarchical model and so on may be used.

It should be noted that here, the dynamic aperture can dynamically change the light transmittance under the control of the control device in the system used to generate the depth image. Here the transmittance of the dynamic aperture can be dynamically changed to a positive number greater than or equal to 0 to or less than 1 or greater than 1. That is, the dynamic aperture can not only restore and reduce the light, but also achieve the amplification of light.

Optional implementation (15): The above execution entity can also perform the following steps.

First, for each shooting configuration information in the shooting-configuration-set, the third and fourth photos corresponding to the shooting configuration information are obtained based on that shooting configuration information, and the third and fourth photos obtained generate a partial scene depth image of the target scene corresponding to the shooting configuration information.

Here, the shooting-configuration-set can include at least one shooting configuration information, wherein, the shooting configuration information can include the exposure start time parameter, the exposure time parameter, the third shot parameter and the fourth shot parameter, the third and fourth photos corresponding to the shooting configuration information can be the exposure duration indicated by the exposure start time and exposure time parameter indicated by the image sensor using the exposure start time parameter in the shooting configuration information, and the exposure time captured in accordance with the third and fourth shooting parameters in the shooting configuration information, respectively.

The third shot parameter may include the third light transmission function and the third light intensity function, and the fourth shot parameter may include the fourth light transmission function and the fourth light intensity function.

The third light transmission function is used to characterize the correspondence between the transmittance of the dynamic aperture that captures the third photo for the image sensor that captures the third photo and time.

The fourth light transmission function is used to characterize the correspondence between the transmittance of the dynamic aperture of the image sensor that took the fourth photo and time.

The third light intensity function is used to characterize the correspondence between the light intensity of the light emitted by the illumination source to the target scene when the third photo is captured and time.

The fourth light intensity function is used to characterize the correspondence between the time and the light intensity of the light emitted by the light source to the target scene when the fourth photo is captured.

The third light transmission function is not a constant and/or a fourth light transmission function is not a constant. The third light transmission function is different from the fourth light transmission function and/or the third light intensity function is different from the fourth light intensity function.

Exposure start time parameters in each shooting configuration information for the shooting-configuration-set are not the same and/or the exposure duration parameters in each shooting configuration information for the shooting-configuration-set are different.

The third shooting parameters in each shooting-configuration-set are the same, and the fourth shooting parameters in each shooting-configuration-set are the same, or the third shooting parameters in each shooting configuration information for the shooting-configuration-set are different, and the fourth shooting parameters in each shooting-configuration-set are not the same.

Then, a depth image of the target scene is generated based on the generated target scene and preset shooting configuration information paired with each shooting configuration information in the set to the corresponding part of the scene depth image.

Optional implementation (16): The first dynamic aperture and the first image sensor can be the same device which means the dynamic aperture function is integrated in the image sensor. In this way, the above-mentioned implementing entity controls the first dynamic aperture transmission for the first image sensor during the preset exposure time, which can include: the photoelectric conversion efficiency and/or photo-optical magnification of the first image sensor within the preset exposure duration according to the first illumination light transmission function.

Moreover, the above-mentioned executive entity controls the light transmittance of the first dynamic aperture for the first image sensor in the preset exposure time according to the second illumination light transmission function, which may include: controlling the photoelectric conversion efficiency and/or photo-optical magnification of the first image sensor in the preset exposure time.

Optional implementation (17): The first dynamic aperture and the first image sensor can be the same device. In this way, the above-mentioned implementing entity controls the transmittance of the first dynamic aperture for the first image sensor for the first image sensor in the preset exposure time by: controlling the photoelectric conversion efficiency and/or photo-optical magnification of the first image sensor during the preset exposure time according to the first illumination light transmission function; The light transmittance of the second image sensor can be controlled by the above-mentioned implementing entity in accordance with the second illumination light transmission function for the second image sensor during the preset exposure period, which may include: the photoelectric conversion efficiency and/or photo-optical magnification of the first image sensor in the preset exposure duration according to the first illumination light transmission function.

Optional implementation (18): the dynamic aperture can also be configured under the control of the control device so that the wavelength of light incident to the dynamic aperture is different from the wavelength of light emitted from the dynamic aperture, and the wavelength of light emitted from the dynamic aperture is related to the preset wavelength sensitivity range of the image sensor corresponding to the dynamic aperture.

The method provided by the above embodiments in this disclosure is to obtain the first and second photos first and second, and then to generate the depth image of the target scene according to the first and second photos obtained, wherein, the first photo and the second photo are captured with different configuration information by dynamically changing the light intensity by using the lighting source, and dynamically changing the transmittance by dynamic aperture.

Firstly, the dynamic apertures are not expensive, and secondly, any currently commercially available lighting sources and image sensors (e.g., currently commercially available cameras) and future-developed lighting sources plus image sensors (e.g., future-developed cameras) can be used to generate depth images.

As a result, economic costs are reduced compared to the existing method used to generate deep images. In addition, the image resolution of any commercially available ordinary camera is generally higher than that of the various imaging devices used to measure the distance of the scene by imaging, so the image resolution of the resulting depth image is improved compared to the existing method used to generate deep images.

Figure 3:
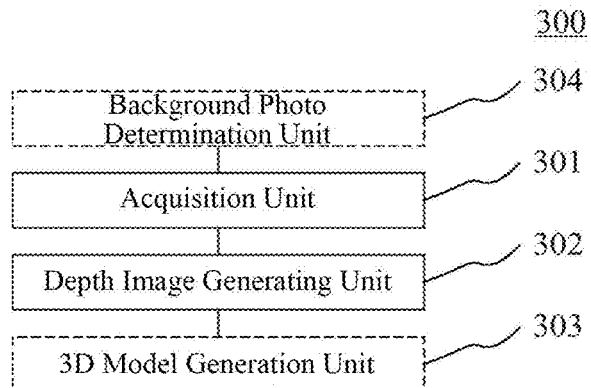
FIG. 3 is a schematic structural diagram of an apparatus for generating a depth image according to an embodiment of the present disclosure.

Further referring to FIG. 3, as the implementation of the method shown in the above-mentioned FIGS., this disclosure provides an embodiment of a device used to generate a depth image, the embodiment of the device corresponding to the method embodiment shown in FIG. 2A, the device can be specifically applied to the control device used to generate the depth image of the system, wherein the system used to generate the depth image includes the lighting source, optical system, control device and at least a set of dynamic aperture and corresponding image sensors. The dynamic aperture is configured to dynamically change the transmittance, exposure start time, and exposure termination time under the control of the control device.

As shown in FIG. 3, the device 300 used to generate the depth image in this example includes: obtaining the unit 301 and the depth image generating unit 302. The acquisition unit 301 is configured to get the first photo and the second photo, while the depth image generation unit 302 is configured to generate the depth image of the above target scene. This example thus allows the depth image generation process of the present invention be used to generate a depth image of the target scene.

In this embodiment, the specific processing of the acquisition unit 301 and the depth image generation unit 302 for the generation of depth image 300 and the technical effects it brings may refer to the relevant instructions in step 201 and step 202 in the corresponding embodiment of FIG. 2A, which shall not be repeated here.

In some of the optional implementation methods of this embodiment, the above device 300 may also include: 3D model generation unit 303 configured to generate the above-mentioned target scene according to the first photo mentioned above, the second photo mentioned above and the above depth image.

In some of the optional implementations of this embodiment, at least one set of dynamic apertures and corresponding image sensors may include the first dynamic aperture and corresponding first image sensors, and the above acquisition unit 301 may include the first control module (not shown in FIG. 3).

Then, the process of using two image sensors as described in the subject disclosure of claim 3 of the present invention may be used to acquire simultaneously the first photo and the second of the target scene.

The first identification module (not shown in FIG. 3) is configured to get the first photo mentioned above;

The second identification module (not shown in FIG. 3), is configured to get the second photo mentioned above.

In some of the optional implementations of this embodiment, at least one set of dynamic apertures and corresponding image sensors may include the first dynamic aperture and corresponding first image sensor, as well as the second dynamic aperture and corresponding second image sensors.

The above acquisition unit 301 may include: the third control module (not shown in FIG. 3) which is configured to use the process of using two image sensors as described in the subject disclosure of claim 3 of the present invention to acquire simultaneously the first photo and the second photo of the target scene.

Wherein, the third determination module (not shown in FIG. 3) is configured to identify the photo captured by the first image sensor as the first photo mentioned above, and the photo space position of the photo captured by the second image sensor is calibrated to the coordinate system of the first image sensor, and the calibrated photo is determined as the second photo.

In some of the optional embodiments of this embodiment, the above optical system may include filters configured to separate the light having at least one wavelength belongs to the first preset wavelength set and the light having at least one wavelength belongs to the second preset wavelength set. The third illumination light may include the first illumination light having at least one wavelength belongs to the first preset wavelength set and include the second illumination light having at least one wavelength belongs to the second preset wavelength set. The above-mentioned first illumination light is reflected by the above-mentioned target scene and reaches the above-mentioned first image sensor via the above-mentioned filter and the above-mentioned first dynamic aperture. The above-mentioned second illumination light is reflected by the above-mentioned target scene and reaches the second image sensor above via the above-mentioned filter and the above-mentioned second dynamic aperture.

Then, it uses the process of using filters, two image sensors, and a third illumination light with two wavelength as described in the subject disclosure of claim 4 of the present invention to acquire simultaneously the first photo and the second photo of the target scene.

In some of the optional implementations of this embodiment, the above-mentioned optical system may include polarization plates configured to separate the polarized state of the first preset polarization state and the second preset polarization state of light. The third illumination light can include the first illumination light having the first preset polarization state mentioned-above and the second illumination light having the second preset polarization state mentioned-above. The above-mentioned first illuminated light is reflected by the above-mentioned target scene and reaches the above-mentioned first image sensor via the above-mentioned polarization film and the above-mentioned first dynamic aperture. The above-mentioned second illumination light is reflected by the above-mentioned target scene and reaches the second image sensor via the above-mentioned polarization film and the above-mentioned second dynamic aperture.

Then, it uses the process of using polarizers, two image sensors, a third illumination light with two polarized light as described in the subject disclosure of claim 5 of the present invention to acquire the first photo and the second photo of the target scene.

In some of the optional embodiments of this embodiment, the above optical system may include the first light separation component, the first filter component and the second filter component. The first filter component can transmit at least one wavelength belonging to the first preset wavelength set of light. The second filter component can transmit at least one wavelength belonging to the second preset wavelength set of light. The first light separation component does not have the filter function. The first filter component, the above-mentioned first dynamic aperture and the first image sensor mentioned above may be located on the first side of the first light separation component mentioned above. The above-mentioned target scene, the second filter component, the second dynamic aperture and the second image sensor can be located on the second side of the first light separation component.

Then, it uses the process of using beam splitting components, two light filters, and two image sensors as described in the subject disclosure claim 6 of the present invention to control the third illumination light with two wavelengths.

In some of the optional embodiments, the above optical system may include a second and third filter components, the above-mentioned second light separation components can be configured to split and transmit the light having at least one wavelength belonging to the first preset wavelength set. The third filter can be configured to transmit the light having at least one wavelength belonging to the second preset wavelength set. The first dynamic aperture and the first image sensor can be located on the first side of the second light separation component. The target scene, the third filter component, the second dynamic aperture and the second image sensor e may be located on the second side of the second light separation component.

The above-mentioned control of the lighting source in the above-mentioned preset exposure time to emit the third illumination light to the target scene may include: performing simultaneously the ninth control operation and the tenth control operation.

In some of the optional embodiments, the above-mentioned set of at least one set of dynamic aperture and corresponding image sensor may comprises: a first dynamic aperture and a first image sensor, wherein first image sensor may be an image sensor array alternately provided with the first image sensor pixel unit and the second image sensor pixel unit. The first image sensor pixel unit can be provided with a filter that transmits at least one wavelength preset wavelength set, and the second image sensor pixel unit can be provided with a filter that transmits at least one wavelength of light belonging to the second preset wavelength set.

The above acquisition unit 301 may include: the fourth control module (not shown in FIG. 3), configured to use the process of alternating two image sensor pixel units as described in the subject disclosure of the present invention to acquire the first photo, the second photo, and the third photo.

The fourth generating module (not shown in FIG. 3) is configured to obtain the first photo captured by the first image sensor, and identifies the obtained photo as the third photo.

The first generating module (not shown in FIG. 3) is configured to obtain the second photo.

The second generating module (not shown in FIG. 3) is configured to obtain the third photo.

In some of the optional embodiments, the above-mentioned set of at least one set of dynamic aperture and corresponding image sensors may include the first dynamic aperture and corresponding first image sensor and the second image sensor, wherein the first image sensor can be located on the first side of the first dynamic aperture, and the second image sensor and the target scene can be located on the second side of the first dynamic aperture. The acquisition unit 301 may include: the fifth control module (not shown in FIG. 3) configured to use the process of controlling the emission and detecting of a third light with one set of dynamic apertures with two image sensors on each of the set's two sides in the subject disclosure of claim 9 of the present invention to acquire the first photo, and the second photo.

The fifth determination module (not shown in FIG. 3) is configured to identify the photo captured by the first image sensor as the first photo, and the photo space position of the photo captured by the second image sensor is calibrated to the coordinate system of the first image sensor, and the calibrated photo is determined as the second photo.

In some of the optional implementations, the above-mentioned depth image generation unit 302 may include: the first equation establishment module (not shown in FIG. 3), configured to set up the first equation and the second equation for each pixel point of the first and second photos at coordinates(m, n). Wherein, the first side is the segment formed by connecting the location of the first image sensor to the corresponding point of the pixel (m, n) of the target scene, and the second side is the segment formed by connecting the first image sensor and the lighting source.

The second equation establishment module (not shown in FIG. 3) is configured to obtain the third equation according to the first equation mentioned above and the second equation mentioned above.

The first equation solution module (not shown in FIG. 3) is configured to solve the third equation above to get z (m, n) and determine the depth value of the pixels in the resulting depth image with coordinates of (m, n); The third generation module (not shown in FIG. 3) is configured to generate a depth image of the target scene based on the depth value of each pixel.

In the optional implementations of this embodiment, the above-mentioned device 300 may also include: a background photo determination unit 304, configured to capture the first photo and the second photo before the second control operation and the fifteenth control operation, wherein the above-mentioned second control operation includes controlling the first image sensor transmission rate of the first dynamic aperture within the above-mentioned preset exposure time according to the first light transmission function. The fifteenth control operations include: controlling the first image sensor to capture the above-mentioned target scene photos, and determining the obtained photo as a background light photo. The above-mentioned depth image generation unit can be further configured to generate the depth image of the target scene based on the background light photo, the first photo, the first photo configuration information, and the second photo configuration information.

In some of the optional embodiments, the above-mentioned depth image generation unit 302 may include: the third equation establishment module (not shown in FIG. 3), configured to establish the fourth equation, the fifth equation and the sixth equation, for each pixel point with the coordinates of (m, n) in the background light photo, the first photo and the second photo.

The fourth equation establishment module (not shown in FIG. 3) is configured to obtain the seventh equation according to the above-mentioned fourth equation, the fifth equation mentioned above and the sixth equation mentioned above.

The second equation solution module (not shown in FIG. 3) is configured to solve the seventh equation to get z(m, n) and determine the depth value of the pixels in the resulting depth image with coordinates of (m, n).

In some of the optional embodiments, the first illumination light transmission function mentioned above is related to the coordinates of each pixel in the first photo, and the second illumination light transmission function is related to the coordinates of each pixel in the second photo.

In some of the optional implementations, the dynamic aperture is an image intensifier. In the optional embodiments, the above dynamic aperture may be a Fabry-Pérot interferometer containing nonlinear crystals.

In some of the optional implementations, the dynamic aperture is configured to dynamically change the transmittance of 0 to or less than 1 or more than 1.

It should be noted that the implementation details and technical effects of each unit in the unit provided for the production of the depth image provided by the embodiment in this disclosure may refer to the description of the other embodiments in this disclosure and shall not be repeated here.

Figure 4:
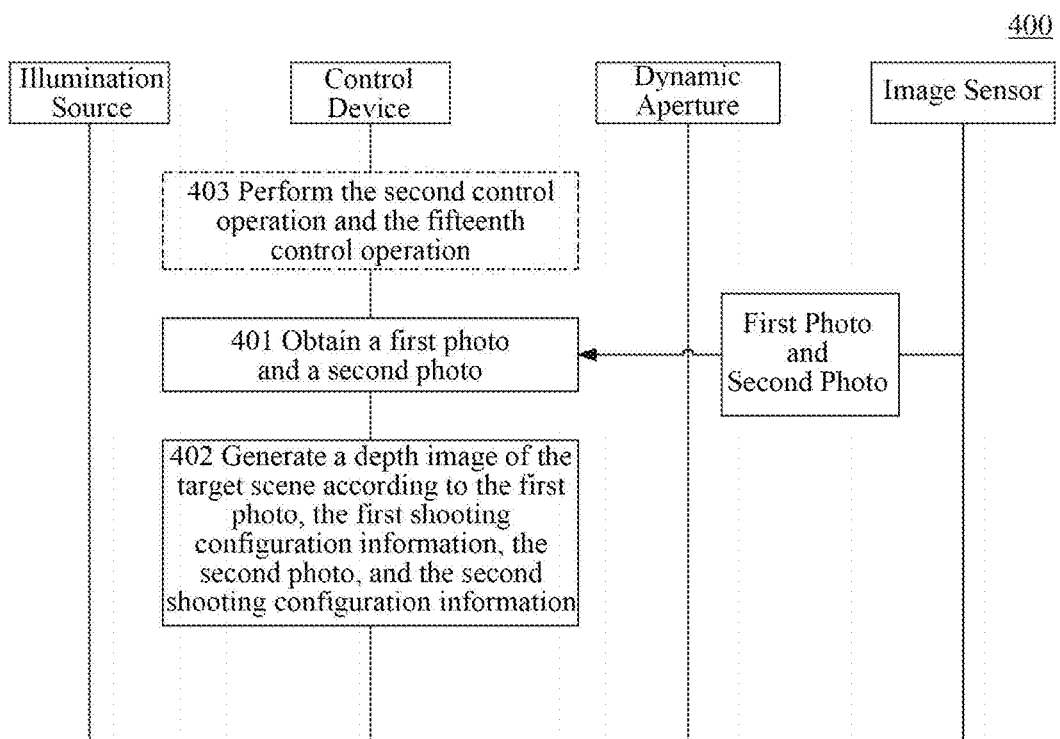
FIG. 4 is a timing diagram of a system for generating a depth image according to an embodiment of the present disclosure.

Reference is made to FIG. 4, which is based on the timing 400 of the embodiment of the system disclosed here for generating a depth image.

The system used to generate a depth image in the embodiment of this disclosure may include a lighting source, a control device, and at least one set of dynamic apertures and corresponding image sensors.

As shown in FIG. 4, the timing 400 according to an embodiment of the system for generating a depth image includes the following steps:

Step 401, the control device is controlled to obtain the first photo and the second photo. In this embodiment, the control device in the system used to generate the depth image can obtain the first and second photos in various ways. Then, the device uses the process of acquiring two photos with two light intensity functions and/or two transmission functions as described in the subject disclosure of claim 1 of the present invention to generate the depth image of the target scene.

In this embodiment, the first illumination light transmission function is not a constant and/or a second light transmission function is not a constant. The first light transmission function is not constant, i.e. the transmission rate of the dynamic aperture, which is used to capture the first photo, is not fixed during the exposure of capturing the first photo. The second light transmission function is not constant, i.e., the transmission rate of the dynamic aperture, which is used to capture the second photo, is not fixed during the exposure of capturing the second photo. If the first light transmission function is not a constant and/or the second light transmission function is not a constant, that means at least one of the following two rates is not constant:

1) the transmission rate of the dynamic aperture, which is used to capture the first photo, is not fixed during the exposure of capturing the first photo, and 2) the transmission rate of the dynamic aperture, which is used to capture the second photo, is not fixed during the exposure of capturing the second photo.

In this embodiment, the first illumination light transmission function is different from the second illumination light transmission function and/or the first illumination light intensity function is different from the second illumination light intensity function. The first illumination light transmission function is different from the second illumination light transmission function, that is, the correspondence between the light intensity and the time during the exposure of capturing the first photo captured by the dynamic aperture is different from the correspondence between the light intensity and the time during the exposure of capturing the second photo captured by the dynamic aperture.

The first illumination light intensity function is different from the second illumination light intensity function, that is, the correspondence between the time and the light intensity of the light emitted to the target scene by the light source in the system when the first photo is captured is different from the correspondence between the time and the light intensity of the light emitted to the target scene by the lighting source when the second photo is captured.

Here, the first and second photos can be captured by the image sensor in the system used to generate the depth image, while the image sensor that captures the first photo can be the same or different from the image sensor that captures the second photo. This allows the control device to obtain the first photo from the image sensor that captures the first photo, as well as the second photo from the image sensor that captures the first photo.

It should be noted that the control device can also use any of the optional implementations (1-8) in the embodiment shown in FIG. 2A to perform step 401, and the specific operation and the technical effects thereof are the same as those discussed in the relevant specific description in FIG. 2A, the detailed discussion of which is omitted here.

Step 402, the device is controlled to generate the depth image of the target scene based on the first photo, the first shooting configuration information, the second photo, and the second shooting configuration information.

Since the first photo is photo of the target scene obtained based on the first configuration information, and the second photo is the photo of the target scene based on the second configuration information, in order to obtain the depth image of the target scene, the control devices can use a variety of implementation methods to generate the depth of the target scene image, by using the first and second photos obtained in step 301, as well as the first configuration information used to capture the first photo and the second configuration information used to capture the second photo. That is, the distance between the area in the target scene and the target image sensor corresponding to each pixel in the depth image is determined. Here, the target image sensor can be an image sensor for the first photo, or an image sensor that captures the second photo, or a virtual image sensor that assumes a depth image.

It should be noted that the control device can also perform step 402 by using the same way as that used to perform step 401.

Specifically, when step 401 is performed in any of the optional implementations (1-8) as shown in FIG. 2A, the control device can also use the way of implementation (10) as shown in FIG. 2A to perform step 402, and its specific operation and its technical effects can refer to the specific description in FIG. 2A, and thus the detailed description thereof is omitted here.

In addition, when step 401 is performed in any of the optional implementations (1-8) as shown in FIG. 2A, the above process 400, before step 401, can also include the following steps 403:

Step 403, the control device performs the second control operation and the fifteenth control operation.

From the description of any optional implementation (1-8) in the embodiment shown in FIG. 2A, as well as the above description of the second control operation and the fifteenth control operation, it can be seen that the background photo and the first photo were captured by the first image sensor. Moreover, in the process of taking the background light photo and the first photo, the transmittance rate of the first dynamic aperture, when the first image sensor captures the first image sensor, is controlled for a preset exposure period according to the first illumination light transmission function. The difference between capturing the background light photo and capturing the first photo lies in: there is no illumination source to illuminate the target scene when capturing the background photo, while at time of capturing the first photo, there is the lighting source which is controlled to illuminate the target scene according to the first illumination light intensity function during the preset exposure time.

In response to the control device determines the background light photo in step 403, step 402 is performed as follows: the control device generates the depth image of the target scene based on the background light photo, the first photo, the first shooting configuration information, the second photo and the second shooting configuration information.

Understandably, with the background light photo, the first photo and the second photo, at least three equations can be established, and the three equations established can be introduced in the unknown, that is, the resulted depth image of each pixel in the target scene corresponds to the region and the distance of the image sensor, and it also uses various implementation methods to solve the equation, so as to obtain the above distance and generate the depth image of the target scene based on the obtained distance.

In some implementations, the detailed operations for the control device to generate the depth image of the target scene based on the background light photo, the first photo, the first shooting configuration information, the second photo and the second shooting configuration information are the same as that of the implementation (11), which has discussed in reference to FIG. 2A, and their technical effects are the same, two. Accordingly, the detailed descriptions are not omitted here.

According to the system provided by the above embodiments in this disclosure, the control device controls the lighting source to dynamically change the light intensity, and controls dynamic aperture to dynamically change of transmittance rate, so as to obtain the first and second photos based on the different configuration information, and according to the obtained first and second photos and corresponding shooting configuration information, generates the depth image of the target scene. First, the dynamic apertures are not expensive, and then any currently commercially available lighting source and image sensors (e.g., currently commercially available cameras) and future development of various lighting sources plus image sensors (e.g., future-developed cameras) can generate the depth images. As a result, economic costs are reduced compared to the existing method used to generate deep images. In addition, the image resolution of any commercially available ordinary camera is generally higher than that of the various imaging devices used to measure the distance of the scene by imaging, so the image resolution of the resulting depth image is improved compared to the existing method used to generate deep images.

Figure 5:
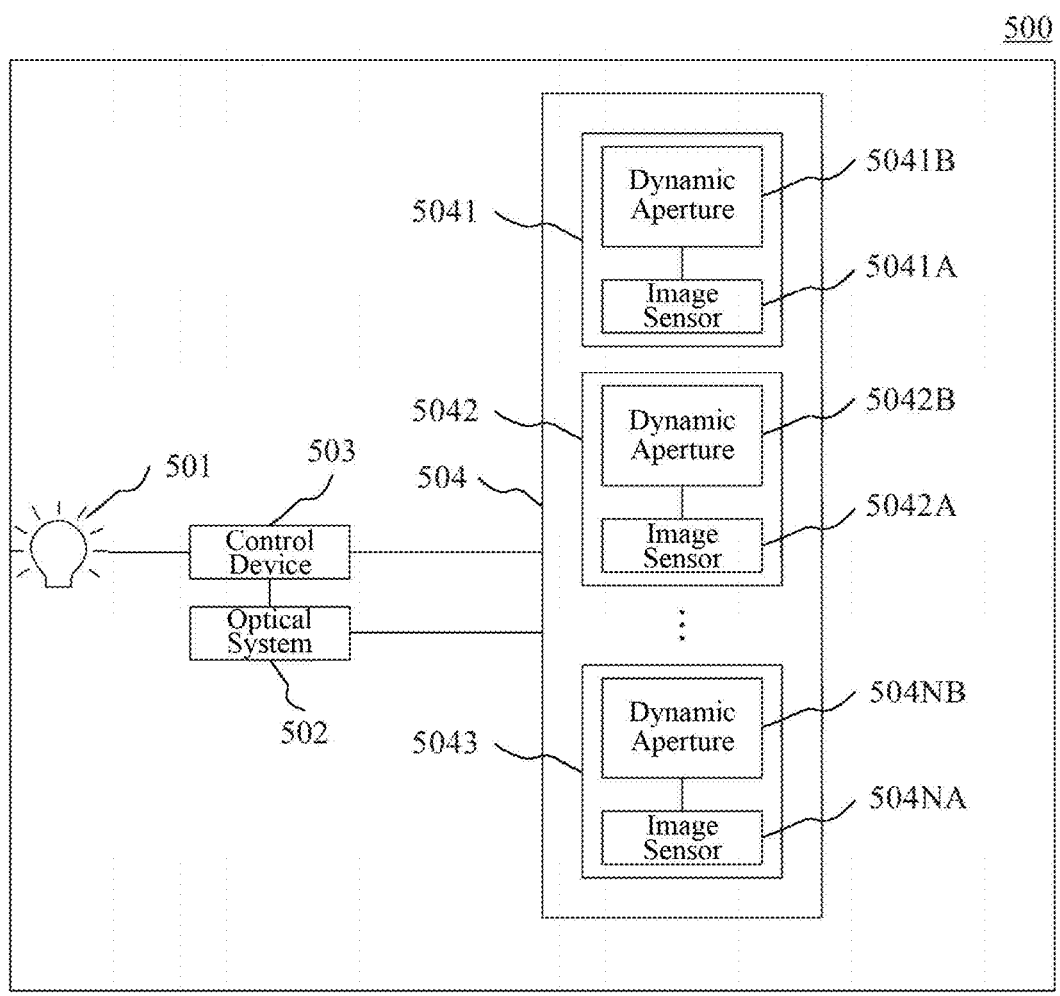
FIG. 5 is a schematic structural diagram of a camera according to an embodiment of the present disclosure.

Reference is made to FIG. 5, which shows a structural schematic of camera 500 according to the embodiment of this disclosure. The camera shown in FIG. 5 is just an example and should not impose any restrictions on the functionality and scope of use of the embodiments disclosed.

As shown in FIG. 5, the camera 500 comprises the lighting source 501, the optical system 502, the control device 503, and at least one set of dynamic aperture and corresponding image sensor 504. At least one set of dynamic aperture and corresponding image sensor 504 can include: a group 5041 composed of a dynamic aperture 5031A and a corresponding image sensor 5041B, a group 5042 composed of a dynamic aperture 5042A and the corresponding image sensor 5042B, . . . , and a group 504N composed of a dynamic aperture 504NA and the corresponding image sensor 504NB, where N is the number of nature.

It should be noted that either of the dynamic aperture 5041A, 5042A, . . . , 504NA can be two different dynamic apertures, or the same dynamic aperture. Either of the image sensors 5041B, 5042B, . . . , 504NB can be two different image sensors or the same image sensor.

Here, the individual dynamic apertures can dynamically change the transmittance rate, the exposure start time, and the exposure termination time under the control device 503.

In some of the optional implementations, the dynamic aperture can be image enhancers. The control device 503 can control the exposure start time, exposure termination time and transmittance of the enhancer by controlling the voltage of the enhancer, i.e., the exposure start time, the exposure termination time, and transmittance of the dynamic aperture.

In some of the optional embodiments, the dynamic aperture may be a Fabry-Pérot interferometer containing nonlinear crystals. The control device 503 can control the exposure start time, exposure termination time and transmission of Fabry-Pérot interferometers containing nonlinear crystals by controlling the voltage of Fabry-Pérot interferometers containing nonlinear crystals, i.e., the exposure start time, exposure termination time and transmission of the dynamic aperture.

Figure 6:
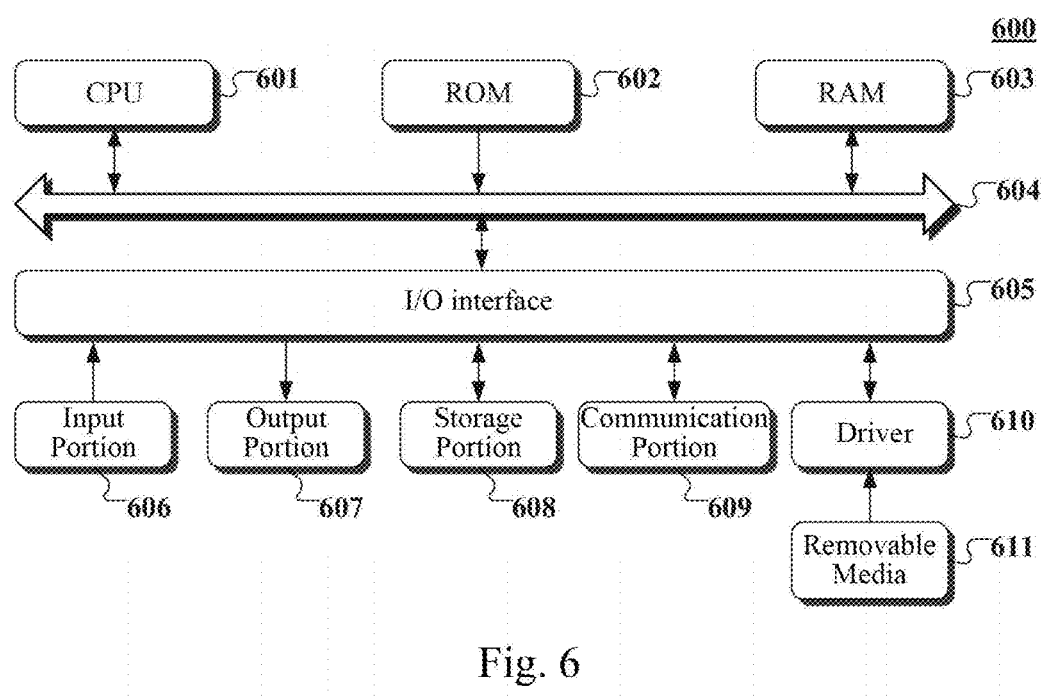
FIG. 6 is a schematic structural diagram of a computer system suitable for implementing a control device of an embodiment of the present disclosure.

The following reference FIG. 6 shows the structure diagram of the computer system 600 suitable for the control equipment used to realize the embodiment of this disclosure. The control device shown in FIG. 6 is only an example and should not impose any restrictions on the functionality and scope of use of the embodiments disclosed herein.

As shown in FIG. 6, the computer system 600 includes a central processing unit (CPU, Central Processing Unit) 601, which can perform a variety of appropriate actions and processing according to the program stored in read-only memory (ROM, Read Only Memory) 602 or from the storage portion 608 loaded into the random access memory (RAM, Random Access Memory) 603. In RAM 603, a variety of programs and data are stored for the operation of the system 600. The CPU 601, ROM 602, and RAM 603 are connected to each other via bus 604. The input/output (I/O, Input/Output) interface 605 is also connected to bus 604.

The following components are connected to I/O interface 605: 606, including keyboard, mouse, etc., 606, including output portion 607 such as the cathode ray tube (CRT, Cathode Ray Tube), liquid crystal display, and speakers, including the storage portion 608, including hard disk, and the communication portion of the network interface card such as LAN (LAN, Local Network Network), etc. The communication section 609 is processed through networks such as the Internet. The drive 610 is also connected to I/O interface 605 as needed. Removable media 611, such as disks, discs, magnetic discs, semiconductor memory, etc., is installed on the drive 610 as needed, so that computer programs read out of it are installed in the storage portion 608 as needed.

In particular, according to the embodiment son of this disclosure, the process described in the reference flow chart above can be implemented as a computer software program. For example, the embodiment seamount in this disclosure includes a computer program product that includes a computer program hosted on a computer readable medium that contains program code for performing the methods shown in the flowchart. In such an example, the computer program can be downloaded and installed from the network via the communication section 609, and/or installed from the removable media 611. When the computer program is executed by a central processing unit (CPU) 601, perform the above functions defined in the method disclosed in this.

It should be noted that the computer-readable media described in this disclosure may be computer-readable signal media or computer-readable storage media or any combination of the above. Computer-readable storage media, for example, may be, but are not limited to, electrical, magnetic, optical, electromagnetic, infrared, or semiconductor systems, devices, or devices, or any more. More specific examples of computer readable storage media can include, but are not limited to, electrical connections with one or more wires, portable computer disks, hard drives, random access memory (RAM), read-only memory (ROM), reformer-programmable read-only memory (EPROM or flash), optical fiber, portable compact disk read-only memory (CD-ROM), optical memory, magnetic memory, or any suitable combination of the above.

For the purposes of this disclosure, a computer-readable storage medium may be any tangible medium that contains or stores a program that can be used or used in conjunction with an instruction-executing system, device, or device. In this disclosure, a computer-readable signal medium may be included in the baseband or as part of the carrier of the transmitted data signal, which carries the computer readable program code. This transmitted data signal can capture many forms, including but not limited to electromagnetic signals, optical signals or any appropriate combination of the above. A computer-readable signal medium may also be any computer-readable medium other than a computer-readable storage medium, which can transmit, propagate, or transmit programs used or used in conjunction with an instruction-executing system, device, or device. The program code contained on the computer-readable media may be transmitted on any appropriate medium, including, but not limited to, wireless, wire, fiber optic cable, RF, etc., or any appropriate combination of the above.

A computer program code for performing this disclosed operation may be written in one or more programming languages or in combination, and the program design language includes object-oriented programming languages—such as Java, Smalltalk, C, and general procedural design languages—such as the "C" language or similar programming language. Program code can be executed completely on the user's computer, partially on the user's computer, as a separate package, partially executed on a remote computer on the user's computer, or completely on a remote computer or server. In cases involving remote computers, remote computers can be connected to a user's computer over any kind of network, including a local area network (LAN) or wide area network (WAN), or to an external computer (e.g. using an Internet service provider to connect over the Internet).

The flowcharts and block diagrams in the drawings illustrate the architecture, functions, and operations that may be implemented in accordance with the systems, methods, and computer program products disclosed in accordance with the various embodiments disclosed herein. At this point, each box in a flowchart or block diagram can represent a module, program segment, or part of the code that contains one or more executable instructions for implementing the specified logical function. It should also be noted that in some implementations as replacements, the functionality indicated in the box can also occur in a different order than the one indicated in the drawings. For example, two boxes represented in succession can actually be executed in large lying in parallel, and they can sometimes be executed in reverse order, depending on the functionality involved. It is also important to note that the combination of boxes in each box diagram and/or flowchart, as well as boxes in the box and/or flowchart, can be achieved with a dedicated hardware-based system that performs specified functions or operations, or with a combination of dedicated hardware and computer instructions.

The units described in the embodiments described in this disclosure can be implemented by software or hardware. The unit described can also be arranged in a processor, for example, as a processor that includes an acquisition unit and a depth image generation unit. Wherein, the names of these units do not in some cases constitute a qualification for the unit itself, for example, the acquisition unit can also be described as "the unit that obtains the first and second photos".

On the other hand, this disclosure also provides a computer-readable medium that may be contained in the device described in the embodiment above, or it may be present alone and not assembled in the device. The above computer readable media stores one or more programs executable by the device to use the depth image generation process of the present invention to generate a depth image of the target scene.

The above description is only a better embodiment of this disclosure and a description of the technical principles applied. The skilled person in the art shall understand that the scope of inventions covered in this disclosure is not limited to the technical schemes formed by the specific combination of the above-mentioned technical features, but shall also cover other technical schemes formed by any combination of the above-mentioned technical features or their equivalents, without departing from the above-mentioned invention ideas. For example, the above characteristics are replaced with the technical features of similar functions disclosed in this disclosure, but are not limited to, and the technical schemes formed by substitution.

What is claimed is:

1. A system for generating a depth image, comprising an illumination source, an optical system, a control device, and at least one set of a dynamic aperture and an image sensor, wherein the dynamic aperture is configured to dynamically change a light transmittance, an exposure start time, and an exposure end time under a control of the control device, and
wherein the control device is configured to:
acquire a first photo and a second photo, wherein the first photo and the second photo are images of the scene respectively acquired by the image sensor according to a first shooting configuration information and a second shooting configuration information, and wherein the first shooting configuration information includes a first light transmission function and a first light intensity function, and the second shooting configuration information includes a second light transmission function and a second light intensity function, and
generate a depth image of the target scene according to the first photo, the first shooting configuration information, the second photo, and the second shooting configuration information,
wherein the first light transmission function is used to characterize a corresponding relationship between the time and the light transmittance of the dynamic aperture when the first photo was captured by the image sensor,
wherein the second light transmission function is used to characterize a corresponding relationship between the time and the light transmittance of the dynamic aperture when the second photo was captured by the image sensor,
wherein the first light intensity function is used to characterize a corresponding relationship between the time and the light intensity of light intensity emitted by the illumination source to the target scene when the first photo is captured,
wherein the second light intensity function is used to characterize a corresponding relationship between the time and the light intensity of the light emitted by the illumination source to the target scene when the second photo is captured,
wherein the first light transmission function is not constant and/or the second light transmission function is not constant, the first light transmission function is different from the second light transmission function, and/or the first light intensity function is different from the second light intensity function.

2. The system of claim 1, wherein the set of the dynamic aperture and the image sensor comprises a first dynamic aperture and a first image sensor; and
the first photo and the second photo are acquired by:
performing a first control operation, a second control operation, and a third control operation simultaneously to make the first image sensor to capture a photo of the target scene,
determining the photo captured by the first image sensor as the first photo;
performing a fourth control operation, a fifth control operation, and the third control operation simultaneously to make the first image sensor to captured a further photo of the target scene, and
determining the further photo captured by the first image sensor as the second photo, wherein the first control operation includes: the illumination source is controlled to emit first illumination light to the target scene within a preset exposure time according to the first light intensity function, and wherein the pulse width of the first illuminating light is less than the first preset proportion of the preset exposure time, and the first preset ratio is greater than zero and less than or equal to 1, the second control operation includes: controlling the light transmittance of the first dynamic aperture within the preset exposure time in accordance with the first light transmission function, the third control operation includes: controlling the first image sensor to capture photos of the target scene, the fourth control operation includes: the illumination source is controlled to emit second illumination light to the target scene within a preset exposure time according to the second light intensity function, wherein the pulse width of the second illumination light is less than the second preset ratio of the preset exposure time, and the second preset ratio is greater than zero and less than or equal to 1;

the fifth control operation includes: controlling the light transmittance of the first dynamic aperture within the preset exposure time in accordance with the second light transmission function.

3. The system of claim 1, wherein the at least one set of a dynamic aperture and an image sensor comprises a first dynamic aperture and a corresponding first image sensor, and a second dynamic aperture and a corresponding second image sensor; and the first photo and the second photo are acquired by:

performing the second control operation, a sixth control operation, a seventh control operation, and an eighth control operation simultaneously, to make the first and second image sensors to capture photos of the target scene, determining the photo captured by the first image sensor as the first photo, and calibrating a spatial position of the photo captured by the second image sensor to a coordinate system of the first image sensor; and determining the calibrated photo as the second photo, wherein, the sixth control operation includes: controlling the second dynamic aperture for the preset exposure time according to the second light transmission function;

the seventh control operation includes: controlling the illumination source to emit a third illuminating light, which includes the first illumination light and the second illumination light, within the preset exposure duration to the target scene, wherein the pulse width of the third illuminating light is less than the third preset proportion of the preset exposure time, and the third preset ratio is greater than zero and less than or equal to 1, and the eighth control operation includes: controlling the first image sensor and the second image sensor to capture photos of the target scene simultaneously.

4. The system of claim 3, wherein the optical system further comprises:

a filter configured to separate a first light, wavelength of which belongs to a first preset wavelength set, from a second light, wavelength of which belongs to a second preset wavelength set, wherein the illumination source is controlled to emit the third illumination light to the target scene within a preset exposure time, by preforming a ninth control operation and a tenth control operation simultaneously, wherein the ninth control operation includes: controlling the illumination source to emit a first illuminating light having at least one wavelength belonging to the first preset wavelength set and light intensity conforming to the first light intensity function; the first illumination light is reflected by the target scene and reaches the first image sensor via the filter and the first dynamic aperture, and the tenth operation includes: controlling the illumination source to emit a second illuminating light having at least one wavelength belonging to the second preset wavelength set and light intensity conforming to the second light intensity function; the second illumination light is reflected by the target scene and reaches the second image sensor via the filter and the first dynamic aperture.

5. The system of claim 3, wherein the optical system comprises:

a polarizer, configured to separate the light whose polarization states are respectively a first preset polarization state and a second preset polarization state, and wherein the illumination source is controlled to emit the third illumination light to the target scene within the preset exposure time by preforming an eleventh control operation and a twelfth control operation simultaneously, wherein the eleventh control operation includes: controlling the illumination source to emit a first illuminating light whose polarization state is the first preset polarization state; the first illuminating light is reflected by the target scene and traverses the polarizer and the first dynamic aperture to reach the first image sensor, the twelfth control operation includes controlling the illumination source to emit a second illuminating light whose polarization state is the second preset polarization state; the second illumination light is reflected by the target scene, and traverses the polarizer and the second dynamic aperture to reach the second image sensor.

6. The system of claim 3, wherein the optical system includes a first beam splitting component, a first filter component, and a second filter component, wherein the first filter component allows light, at least one wavelength of which belongs to a first preset wavelength set, to pass there-through, the second filter component allows light, at least one wavelength of which belongs to a second preset wavelength set, to pass there-through, wherein the first dynamic aperture and the first image sensor are located on a side of a first surface of the first light splitting component, and wherein the target scene, the second filter component, the second dynamic aperture and the second image sensor are located on a side of a second surface of the first light splitting component.

7. The system of claim 3, wherein the optical system comprises:

a second light splitting component configured to divide light and transmit the light, at least one wavelength of which belongs to the first preset wavelength set, and a third filter component configured to allow light, at least one wavelength of which belongs to a second preset wavelength set, to pass there-through wherein the first dynamic aperture and the first image sensor are located on a side of a first surface of the second light splitting component, and wherein the target scene, the third filter component, the second dynamic aperture and the second image sensor are located on a side of a second surface of the second light splitting component.

8. The system of claim 1, wherein the at least one set of a dynamic apertures and a corresponding image sensors comprises first dynamic aperture and corresponding first image sensors, wherein the first image sensors are image sensor arrays alternately provided with first image sensors pixel units and second image sensor pixel units, each of the first image sensor pixel units is provided with a filter that transmits light, at least one wavelength of which belongs to a first preset wavelength set, and wherein each of the second image sensor pixel units is provided with a filter that transmits light, at least one wavelength of which belongs to the second preset wavelength set; and wherein the first photo and the second photo are acquired by:

performing simultaneously the ninth control operation, the tenth control operation, a thirteenth control operation, and the third control operation to acquire a photo captured by the first image sensor, and determining the acquired photo as a third photo;

wherein the thirteenth control operation includes: controlling the light transmittance of the first dynamic aperture within the preset exposure time according to the first light transmission function for the light whose wavelength belongs to the first preset wavelength set and/or controlling the first dynamic aperture according to the second light transmission function for the light whose wavelength belongs to the second preset wavelength, generating the first photo by using pixel values corresponding to each pixel point collected by the pixel unit of the first image sensor in the third photo;

generating the second photo by using the pixel values corresponding to the respective pixel points collected by the pixel unit of the second image sensor in the third photo.

9. The system of claim 1, wherein the at least one set of a dynamic aperture and a corresponding image sensor comprises a first dynamic aperture and corresponding first and second image sensors, wherein the first image sensor is located on a side of a first surface of the first dynamic aperture, and the second image sensor and the target scene are located on aside of a second surface of the first dynamic aperture; and wherein, the first photo and the second photo are acquired by:

performing a fourteenth control operation, the seventh control operation, and the eighth control operation simultaneously to obtain photo captured by the first image sensor;

wherein the fourteenth control operation includes according to the first light transmission function and the second light transmission function, respectively, controlling the transmittance and reflectance of the first dynamic aperture according to the first light transmission function and the second light transmission function, respectively, during the preset exposure time, determining the photo captured by the first image sensor as the first photo;

calibrating a spatial position of a photo captured by the second image sensor to a coordinate system of the first image sensor; and determining the calibrated photo as the second photo.

10. The system of claim 2, wherein the first dynamic aperture and the first image sensor are the same device; and wherein the light transmittance of the first dynamic aperture is controlled within the preset exposure time according to the first light transmission function by:

controlling a photoelectric conversion efficiency and/or photoelectric magnification of the first image sensor within the preset exposure time according to the first light transmission function; and wherein the light transmittance of the first dynamic aperture is controlled within the preset exposure time according to the second light transmission function by:

controlling the photoelectric conversion efficiency and/or photoelectric magnification of the first image sensor within the preset exposure time period according to the second light transmission function.

11. The system of claim 3, wherein the first dynamic aperture and the first image sensor are the same device; and wherein the light transmittance of the first dynamic aperture is controlled within the preset exposure time according to the first light transmission function by:

controlling the photoelectric conversion efficiency and/or photoelectric magnification of the first image sensor within the preset exposure time according to the first light transmission function; and wherein the light transmittance of the second dynamic aperture is controlled within the preset exposure time according to the second light transmission function by:

controlling the photoelectric conversion efficiency and/or photoelectric magnification of the first image sensor within the preset exposure time period according to the first light transmission function.

12. The system of claim 2, wherein the dynamic aperture is further configured to make the wavelength of the light incident on the dynamic aperture different from the wavelength of the light emitted from the dynamic aperture under the control of the control device, and the wavelength of the light emitted from the dynamic aperture is related to the preset wavelength sensitivity range of the image sensor corresponding to the dynamic aperture.

13. The system of claim 2, wherein the control device is further configured to:

perform the second control operation and a fifteenth control operation simultaneously, before acquiring the first photo and the second photo, wherein the fifteenth control operation includes controlling the first image sensor to take a photo of the target scene, and determining the photo taken by the first image sensor to be a background light photo, and wherein the generating further comprises:

generating the depth image of the target scene according to a background light photo, the first photo, the first shooting configuration information, the second photo, and the second shooting configuration information.

14. The system of claim 1, wherein the first light transmission function is related to coordinates of each pixel in the first photo, and the second light transmission function is related to the coordinate of each pixel in the second photo.

15. The system of claim 1, wherein the dynamic aperture is an image intensifier.

16. The system of claim 1, wherein the dynamic aperture is a Fabry-Pérot interferometer containing a nonlinear crystal.

17. The system of claim 1, wherein the dynamic aperture is configured to dynamically change the transmittance of a positive number greater than or equal to 0 to less than or equal to 1, or greater than 1, under the control of the control device.

18. A method for generating a depth image, comprising:
acquiring a first photo and a second photo of a scene, by an image sensor, according to a first shooting configuration information and a second shooting configuration information, wherein the first information includes a first light transmission function and a first light intensity function, the second information includes a second light transmission function and a second light intensity function; and
generating a depth image of the target scene according to the first photo, the first shooting configuration information, the second photo, and the second shooting configuration information,
wherein the first light transmission function is used to characterize a corresponding relationship between the light transmittance of the dynamic aperture and time when the first photo was captured by the image sensor,
wherein the second light transmission function is used to characterize a corresponding relationship between the light transmittance of the dynamic aperture and time when the second photo was captured by the image sensor,
wherein the first light intensity function is used to characterize a corresponding relationship between the intensity of light emitted by the illumination source to the target scene and time when the first photo is captured,
wherein the second light intensity function is used to characterize a corresponding relationship between the intensity of light emitted by the illumination source to the target scene and time when the second photo is captured,
wherein the first light transmission function is not constant and/or the second light transmission function is not constant, the first light transmission function is different from the second light transmission function, and/or the first light intensity function is different from the second light intensity function.

19. The method of claim 18, wherein the set of the dynamic aperture and the image sensor comprises a first dynamic aperture and a first image sensor; and
wherein the acquiring further comprises:
performing the first control operation, the second control operation, and the third control operation simultaneously to make the first image sensor to capture a photo of the target scene,
determining the photo captured by the first image sensor as the first photo;
performing the fourth control operation, the fifth control operation, and the third control operation simultaneously to make the first image sensor to capture a further photo of the target scene, and
determining the further photo captured by the first image sensor as the second photo,
wherein the first control operation includes: the illumination source is controlled to emit first illumination light to the target scene within a preset exposure time according to the first light intensity function, and wherein the pulse width of the first illuminating light is less than the first preset proportion of the preset exposure time, and the first preset ratio is greater than zero and less than or equal to 1,
the second control operation includes: controlling the light transmittance of the first dynamic aperture within the preset exposure time in accordance with the first light transmission function,
the third control operation includes: controlling the first image sensor to capture photos of the target scene,
the fourth control operation includes: the illumination source is controlled to emit second illumination light to the target scene within a preset exposure time according to the second light intensity function, wherein the pulse width of the second illumination light is less than the second preset ratio of the preset exposure time, and the second preset ratio is greater than zero and less than or equal to 1;
the fifth control operation includes: controlling the light transmittance of the first dynamic aperture within the preset exposure time in accordance with the second light transmission function.

20. The method of claim 18, wherein the acquiring further comprises:
capturing, by a first image sensor, a photo of the target scene,
determining the photo captured by the first image sensor as the first photo, and
calibrating a spatial position of the photo captured by the second image sensor to a coordinate system of the first image sensor; and
determining the calibrated photo as the second photo.

* * * * *